United States Patent
Kido

(10) Patent No.: US 8,063,944 B2
(45) Date of Patent: Nov. 22, 2011

(54) IMAGING APPARATUS

(75) Inventor: Toshihito Kido, Hino (JP)

(73) Assignee: Sony Corporation, Tokyo (JP)

(*) Notice: Subject to any disclaimer, the term of this patent is extended or adjusted under 35 U.S.C. 154(b) by 266 days.

(21) Appl. No.: 11/914,432

(22) PCT Filed: Mar. 12, 2007

(86) PCT No.: PCT/JP2007/054791
§ 371 (c)(1),
(2), (4) Date: Nov. 12, 2008

(87) PCT Pub. No.: WO2007/119331
PCT Pub. Date: Oct. 25, 2007

(65) Prior Publication Data
US 2009/0213233 A1    Aug. 27, 2009

(30) Foreign Application Priority Data

Mar. 14, 2006   (JP) .................................. 2006-069451

(51) Int. Cl.
*H04N 5/228* (2006.01)
(52) U.S. Cl. .................. 348/222.1; 348/223.1; 348/340; 348/345; 348/348
(58) Field of Classification Search ............... 348/222.1, 348/223.1, 335, 340, 345, 348, 362
See application file for complete search history.

(56) References Cited

U.S. PATENT DOCUMENTS 5,153,783 A * 10/1992 Tamada et al. ................. 386/117
5,283,428 A *  2/1994 Morishita et al. .......... 250/214.1

FOREIGN PATENT DOCUMENTS

| JP | 1-100523    | 4/1989 |
| JP | 6-68598     | 8/1994 |
| JP | 11-41523    | 2/1999 |
| JP | 2000-152057 | 5/2000 |
| JP | 2004-153474 | 5/2004 |
| JP | 2005-45544  | 2/2005 |
| JP | 2005-184380 | 7/2005 |
| JP | 2007-053742 | 3/2007 |

* cited by examiner

Primary Examiner — Yogesh Aggarwal
(74) Attorney, Agent, or Firm — Oblon, Spivak, McClelland, Maier & Neustadt, L.L.P.

(57) ABSTRACT

An image sensor includes a plurality of pixels arranged in a matrix and has an electronic focal plane shutter function for providing a predetermined reset signal to the pixels on a pixel line to pixel line basis to perform an exposure start operation. A mechanical focal plane shutter is disposed immediately before the image sensor. A control unit causes the image sensor to perform the exposure start operation using the electronic focal plane shutter function a predetermined period of time after a curtain group of the mechanical focal plane shutter is open and causes the mechanical focal plane shutter to perform an exposure end operation when a shutter speed is set to low. The control unit causes the mechanical focal plane shutter to perform the exposure start operation and the exposure end operation when the shutter speed is set to high.

17 Claims, 27 Drawing Sheets

FIG. 19

INFORMATION COMMUNICATED WHEN LENS IS CHANGED

| LENS FOCAL LENGTH | 17-70 mm ZOOM | 85 mm |
|---|---|---|
| APERTURE VALUE | F2.8 TO F22 IN 1/3 STEPS | F1.4 TO F22 IN 1/3 STEPS |
| LENS FORMAT | ZOOM AND IF | FIXED FOCAL LENGTH, EXIT PUPIL MOVED WHEN LENS IS FOCUSED |
| POSITION OF EXIT PUPIL | EXIT PUPIL FOR EACH OF FOCAL LENGTHS | EXIT PUPIL FOR EACH OF FOCAL LENGTHS |
| LIGHT FALLOFF AT EDGES | AMOUNT OF CHANGE FOR EACH OF APERTURE VALUES | AMOUNT OF CHANGE FOR EACH OF APERTURE VALUES |

INFORMATION COMMUNICATED DURING CAPTURING OF IMAGE

| LENS FOCAL LENGTH | VALUE SET BY PHOTOGRAPHER (CAMERA) |
|---|---|
| APERTURE VALUE | VALUE SET BY PHOTOGRAPHER (CAMERA) | ary between the constant speed of the first curtain and the changing speed of the second curtain. Due to the difference in speed between the curtains, especially during an operation with high SS (shutter speed) which causes a slit exposure, stable exposure cannot be obtained, that is, unevenness of exposure occurs. Furthermore, since the position of the first curtain is separated from the position of the second curtain, such an optical positional shift causes an edge darkening problem of a light ray depending on the position of the exit pupil and the F no., and therefore, unevenness of exposure occurs.
IMAGING APPARATUS

TECHNICAL FIELD

The present invention relates to an image pickup unit and an image pickup apparatus including a MOS image sensor and, in particular, to an image pickup unit and an image pickup apparatus that use an electronic focal plane shutter for a first curtain and a mechanical focal plane shutter for a second curtain.

BACKGROUND ART

MOS (metal oxide semiconductor) based X-Y scanning image sensors can provide a high-speed readout operation of a pixel signal, low power consumption, and high integration as compared with CCD (charged coupled Device) based image sensors. Since MOS-based X-Y scanning image sensors satisfy the requirement for image pickup apparatuses in terms of the size and performance thereof, MOS-based X-Y scanning image sensors are widely used for image sensors mounted in image pickup apparatuses. In addition, MOS-based X-Y scanning image sensors can provide a function of performing a random scan that enables readout of an electrical charge from any one specified pixel using a horizontal signal line and a vertical signal line.

In general, image pickup apparatuses (e.g., digital still cameras) including such an image sensor perform an image capturing operation as shown in FIG. 27. That is, when, for example, a release button is pressed, the image pickup apparatuses receive an image capturing start instruction. Thereafter, an image sensor is reset at a time 901. At that time, all of pixels of the image sensor are simultaneously reset (one-time reset). Subsequently, a first curtain of a mechanical shutter for opening a light path is open at a time 902 so that exposure to the image sensor is started (a mechanical first curtain). At time 903, a second curtain of the mechanical shutter for blocking the light path is closed so that the exposure is completed (a mechanical second curtain). A time difference Δt between the mechanical first curtain and the mechanical second curtain is defined as an exposure time. When the second curtain is closed and the exposure is completed, pixel data (electrical charge) is read out from each of the pixels of the image sensor at a time 904. That is, a captured image 905 is sequentially read out on a pixel line to pixel line basis (sensor readout). A diagram 910 illustrates the case where the time difference between the mechanical first curtain and the mechanical second curtain is large, that is, the case of a low-speed shutter. In contrast, a diagram 920 illustrates the case where the time difference between the mechanical first curtain and the mechanical second curtain is small, that is, the case of a high-speed shutter.

In such an image pickup apparatus, vibration of the mechanical focal plane shutter may occur. This vibration causes a negative impact on the image capturing (exposure) operation. That is, a curtain (a first curtain) starts running for opening a light path. When the curtain completes the opening operation, the curtain collides with a shutter plate in a shutter unit. Thus, shock vibration (vibration occurring at a time 931 shown in FIG. 28 (a first curtain shock)) occurs. This vibration causes vibration of the image sensor, and therefore, an image on the image sensor is blurred during the exposure time Δt.

To solve this problem, for example, Japanese Unexamined Patent Application Publication No. 2000-152057 describes technology in which a first curtain of the shutter operation is performed by an electronic focal plane shutter and a second curtain is performed by a mechanical focal plane shutter. That is, a reset signal that causes each of pixels of the image sensor to perform a reset operation is sequentially supplied on a pixel line to pixel line basis so that the image sensor (the electronic focal plane shutter serving as a first curtain) starts an exposure operation. The exposure operation is completed by closing a curtain (the mechanical focal plane shutter serving as a second curtain) after a predetermined exposure time has elapsed.

In general, the moving velocity of a curtain of a mechanical focal plane shutter is not constant. At a start point, the moving velocity is relatively low. At an end point, the moving velocity is relatively high since the velocity of the curtain has been increased. In addition, the moving velocity of the curtain may change in accordance with changes in temperature and moisture and a change in position thereof. Accordingly, when, using a first curtain of the electronic focal plane shutter, a reset signal is sequentially supplied to the pixel lines from the start point in the moving direction of the curtain at predetermined intervals (a constant velocity of the curtain) in order to start exposure of each pixel line, a difference occurs between the constant speed of the first curtain and the changing speed of the second curtain. Due to the difference in speed between the curtains, especially during an operation with high SS (shutter speed) which causes a slit exposure, stable exposure cannot be obtained, that is, unevenness of exposure occurs. Furthermore, since the position of the first curtain is separated from the position of the second curtain, such an optical positional shift causes an edge darkening problem of a light ray depending on the position of the exit pupil and the F no., and therefore, unevenness of exposure occurs.

Some image pickup apparatuses employ an electronic shutter for both first and second curtains. More specifically the image pickup apparatuses employ an CCD-based image sensor and perform an exposure operation, that is, the start and end operations of exposure using an electronic shutter control of the image sensor. Note that although the image pickup apparatuses include a mechanical focal plane shutter having only a curtain corresponding to the second curtain, this curtain is used simply for blocking light. In such image pickup apparatuses, total power consumption is disadvantageously increased as compared with the image pickup apparatuses using a MOS-based image sensor. In addition, in terms of power consumption of mechanical focal plane shutter, operating power for charging, that is, power required for returning the curtain to the original position is large as compared with electronic focal plane shutters. Therefore, to reduce power consumption, use of an electronic focal plane shutter is advantageous over use of a mechanical focal plane shutter.

Accordingly, the present invention provides an image pickup apparatus that achieves a first curtain using an electronic focal plane shutter and a second curtain using a mechanical focal plane shutter and that can prevent the occurrence of a difference in curtain speed between the first curtain and the second curtain or defect due to a positional shift of the first curtain from the second curtain (the occurrence of an edge darkening problem), such as unevenness of exposure, and that can reduce power consumption.

DISCLOSURE OF INVENTION

According to one example of the invention, an image pickup apparatus includes a MOS image sensor including a plurality of pixels arranged in a matrix, where the MOS image sensor has an electronic focal plane shutter function for providing a predetermined reset signal to the pixels on a pixel line to pixel line basis to perform an exposure start operation, a mechanical focal plane shutter disposed immediately before the image sensor for performing a light path opening operation and a light path closing operation for light led to the image sensor, control means for controlling the operations of the image sensor and the mechanical focal plane shutter, and exposure control means for determining at least a shutter speed. The control means causes the image sensor to perform the exposure start operation using the electronic focal plane shutter function and causes the mechanical focal plane shutter to perform an exposure end operation when the shutter speed is set to low by the exposure control means, and the control means causes the mechanical focal plane shutter to perform the exposure start operation and the exposure end operation when the shutter speed is set to high by the exposure control means.

In such a configuration, the image sensor is of a MOS type. In a low speed shutter mode in which a shutter speed is set to low by the exposure control means, the exposure start operation is performed using the electronic focal plane shutter function of the image sensor (use of the electronic focal plane shutter for the first curtain). In addition, the exposure end operation is performed by the mechanical focal plane shutter. In contrast, in a high speed shutter mode in which a shutter speed is set to high by the exposure control means, the exposure start operation and the exposure end operation are performed by the mechanical focal plane shutter (use of the mechanical focal plane shutter for the first curtain).

The image pickup apparatus can include vibration detecting means for detecting an amount of vibration applied to the image pickup apparatus, and the image pickup apparatus has a vibration correction function for correcting the vibration thereof.

In such a structure, the image pickup apparatus has a vibration correction function for correcting the vibration thereof. In order to correct the vibration thereof, an amount of vibration applied to the image pickup apparatus is detected by the vibration detecting means.

Additionally, in this structure, the image pickup apparatus can further include a photo-taking lens for forming a subject image on the image sensor, where the photo-taking lens has a variable focal length. The control means can change a switching point for determining whether the exposure start operation is performed by the electronic focal plane shutter or the mechanical focal plane shutter in accordance with the focal length.

In such a structure, the control means changes a switching point for determining whether the exposure start operation is performed by the electronic focal plane shutter or the mechanical focal plane shutter in accordance with the set focal length of a photo-taking lens having a variable focal length.

Additionally, in this structure, the image pickup apparatus can further include an interchangeable photo-taking lens for forming a subject image on the image sensor. The control means can change a switching point for determining whether the exposure start operation is performed by the electronic focal plane shutter or the mechanical focal plane shutter in accordance with a focal length of the photo-taking lens being used.

In such a structure, the control means changes a switching point for determining whether the exposure start operation is performed by the electronic focal plane shutter or the mechanical focal plane shutter in accordance with a focal length of the photo-taking lens (the interchangeable lens) being used Additionally, in this structure, the control means can change a switching point for determining whether the exposure start operation is performed by the electronic focal plane shutter or the mechanical focal plane shutter in accordance with information about an aperture value and the position of an exit pupil of the photo-taking lens during capturing of an image.

In such a structure, the control means changes a switching point for determining whether the exposure start operation is performed by the electronic focal plane shutter or the mechanical focal plane shutter in accordance with information about an aperture value and the position of an exit pupil of the photo-taking lens during capturing of an image.

Additionally, in this structure, when the exposure start operation is performed through the electronic focal plane shutter function, the control means can change a parameter that controls the exposure start operation through the electronic focal plane shutter function by using at least one of a shutter speed, a focal length, an aperture value, and information about the position of the exit pupil.

In such a structure, when the exposure start operation is performed through the electronic focal plane shutter function, the control means changes a parameter that controls the exposure start operation through the electronic focal plane shutter function by using at least one of a shutter speed, a focal length, an aperture value, and information about the position of the exit pupil.

Additionally, in this structure, the image pickup apparatus can further include a photo-taking lens for forming a subject image on the image sensor, a movable mirror for leading a light ray output from the photo-taking lens to an optical finder and the image sensor, and a release button used for instructing the start of capturing the subject image. When a light path is made open to the image sensor by the movable mirror in response to a user instruction to start capturing the image through an operation of the release button, and the exposure start operation is performed by one of focal plane shutters realized by the electronic focal plane shutter function and the mechanical focal plane shutter, the control means can cause the one of the focal plane shutters to perform the exposure start operation after a predetermined period of time has elapsed since the operation of the movable mirror was completed, regardless of whether a low-speed shutter or a high-speed shutter is used.

In such a structure, the control means causes one of the electronic focal plane shutter (the electronic focal plane shutter function of the image sensor) and the mechanical focal plane shutter to perform the exposure start operation after a predetermined period of time has elapsed since the operation of the movable mirror was completed, regardless of whether a low-speed shutter or a high-speed shutter is used.

Additionally, in this structure, the mechanical focal plane shutter can include a first curtain functioning as a curtain for opening the light path and a second curtain functioning as a curtain for closing the light path, and, when the first curtain is in a closed state in which the light path is not open during an image capturing standby time and the low-speed shutter is used, the control means can cause the image sensor to perform an exposure start operation using the electronic focal plane shutter function after a predetermined period of time has elapsed since the first curtain was changed from the closed state to an open state.

In such a structure, when the first curtain is in a closed state in which the light path is not open during an image capturing standby time and the low-speed shutter is used, an exposure start operation using the electronic focal plane shutter (the electronic focal plane shutter function of the image sensor) is performed after a predetermined period of time has elapsed since the first curtain was changed from the closed state to an open state.

Additionally, in this structure, the control means can control the opening operation in which the first curtain is changed from a closed state to an open state so that a time when the opening operation is performed is substantially synchronized with a time when the movable mirror operates, and the first curtain moves in a direction opposite to a moving direction of the movable mirror.

In such a structure, a time when the opening operation, in which the first curtain is changed from a closed state to an open state, is performed is substantially synchronized with a time when the movable mirror operates, and the first curtain moves in a direction opposite to a moving direction of the movable mirror (i.e., the first curtain moves in a direction in which the first curtain is made open).

According to one example of the invention, the first curtain and the second curtain are provided by the mechanical focal plane shutter when a high-shutter speed is used. Accordingly, problems, such as unevenness of exposure, caused by the difference in speed between the first curtain and the second curtain and a positional shift between the curtains (the occurrence of an edge darkening phenomenon) can be prevented. When a low-shutter speed is used, the first curtain is provided by the electronic focal plane shutter. Accordingly, power consumption can be reduced as compared with use of the first curtain provided by the mechanical focal plane shutter. In addition, since the exposure time is long, the occurrence of unevenness of exposure due to the difference in speed between the first curtain and the second curtain and a positional shift between the curtains is significantly reduced. Therefore, unevenness of exposure does not practically occur. In particular, in the case where a live view is displayed, the power consumption is significantly reduced. In addition, by using an image sensor of a MOS type, the power consumption can be reduced as compared with, for example, an image sensor of a CCD type According to another example of the invention, the image pickup apparatus includes vibration detecting means for detecting vibration. In particular, at a low shutter speed, vibration has a big impact on the image pickup apparatus. The running vibration of the first curtain of the mechanical focal plane shutter causes an error of the amount of vibration detected by the vibration detecting means. Accordingly, by using the first curtain of the electronic focal plane shutter, erroneous detection of the vibration detecting means can be prevented.

According to yet another example of the invention, a switching point for determining whether the exposure start operation is performed by the electronic focal plane shutter or the mechanical focal plane shutter is changed in accordance with the focal length of a photo-taking lens (including an interchangeable photo-taking lens). Accordingly, in accordance with the performance of the photo-taking lens being used, for example, when an edge darkening problem caused by a positional shift between the curtains of the electronic focal plane shutter and the mechanical focal plane shutter rarely occurs, the electronic focal plane shutter is used for the first curtain at a higher shutter speed. That is, in accordance with the occurrence of an edge darkening problem, flexible shutter control can be provided so that the upper limit of the shutter speed that determines the use of the first curtain of the electronic focal plane shutter can be changed to any value.

According to a further example of the invention, a switching point for determining whether the exposure start operation is performed by the electronic focal plane shutter or the mechanical focal plane shutter is changed in accordance with information about an aperture value and the position of an exit pupil of the photo-taking lens (including an interchangeable photo-taking lens) during capturing of an image. Accordingly, in accordance with the performance of the photo-taking lens being used, for example, when an edge darkening problem caused by a positional shift between the curtains of the electronic focal plane shutter and the mechanical focal plane shutter rarely occurs, the electronic focal plane shutter is used for the first curtain at a higher shutter speed. That is, in accordance with the occurrence of an edge darkening problem, flexible shutter control can be provided so that the upper limit of the shutter speed that determines the use of the first curtain of the electronic focal plane shutter can be changed to any value.

According to yet a further example of the invention, a parameter that controls the exposure start operation through the electronic focal plane shutter function can be changed by using at least one of a shutter speed, a focal length, an aperture value, and information about the position of the exit pupil. Accordingly, for example, the shutter speed of the electronic focal plane shutter can be changed (control for increasing or decreasing the curtain speed can be performed) on the basis of at least one of a shutter speed, a focal length, an aperture value, and information about the position of the exit pupil. Therefore, at a low shutter speed in which the electronic focal plane shutter is used, in accordance with the performance of the photo-taking lens, for example, as the focal length is decreased and the F no. is decreased or as the position of the exit pupil is closer to the exposure surface, the shutter speed of the electronic focal plane shutter can be increased. As a result, the occurrence of unevenness of exposure due to the edge darkening phenomenon of a light ray at a low shutter speed can be prevented (or reduced).

According to another example of the invention, the exposure start operation is performed by one of focal plane shutters realized by the electronic focal plane shutter function and the mechanical focal plane shutter after a predetermined period of time has elapsed since the operation of the movable mirror was completed. Accordingly, a user can capture an image (start an exposure operation) at the same release timing, regardless of whether the electronic focal plane shutter or the mechanical focal plane shutter is used. Consequently, an image pickup apparatus having excellent ease of use can be provided.

According to a yet further example of the invention, an exposure start operation using the electronic focal plane shutter function is performed after a predetermined period of time has elapsed since the first curtain (a curtain member) of the mechanical focal plane shutter performed an opening operation. If, for example, the predetermined period of time is set to a time in which shock vibration caused by the first curtain (the curtain member) disappears (is dumped), a negative effect of the running vibration of the first curtain on the vibration detecting operation and the exposure operation can be eliminated. As a result, a precise vibration correction operation and a precise image capturing operation can be performed, and therefore, an excellent captured image can be obtained.

According to an additional example of the invention, the shock vibration caused by the opening operation of the first curtain and the shock vibration caused by the opening operation of the mirror can be canceled each other out. Accordingly, a negative effect of impact vibration on the detecting operation of vibration or on the exposure operation can be further reduced. In addition, the impact vibration can be rapidly dumped (stopped). That is, since dumping of the impact vibration can be forcibly performed, a time required for wait-

BRIEF DESCRIPTION OF THE DRAWINGS

FIG. 19 illustrates an example of the state information data communicated when a photo-taking lens is replaced and an image is captured;

BEST MODE FOR CARRYING OUT THE INVENTION

Embodiments of the present invention are described below with reference to the accompanying drawings.

Description of Camera Structure

Figure 1:
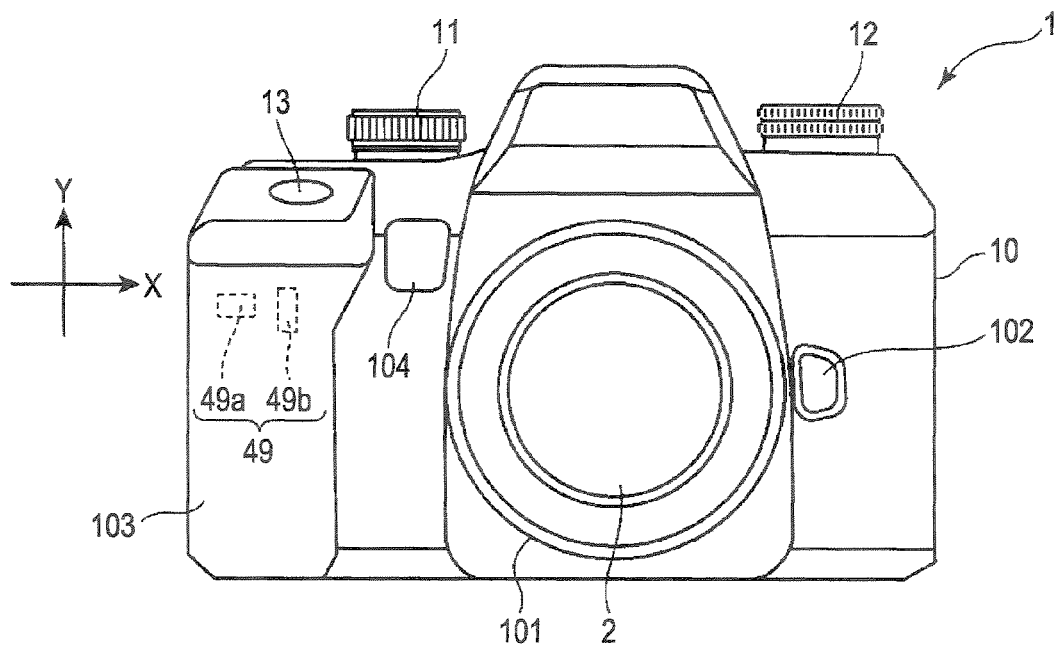
FIG. 1 illustrates a front appearance of a digital camera (an image pickup apparatus) including an image pickup unit according to the present invention.
Figure 2:
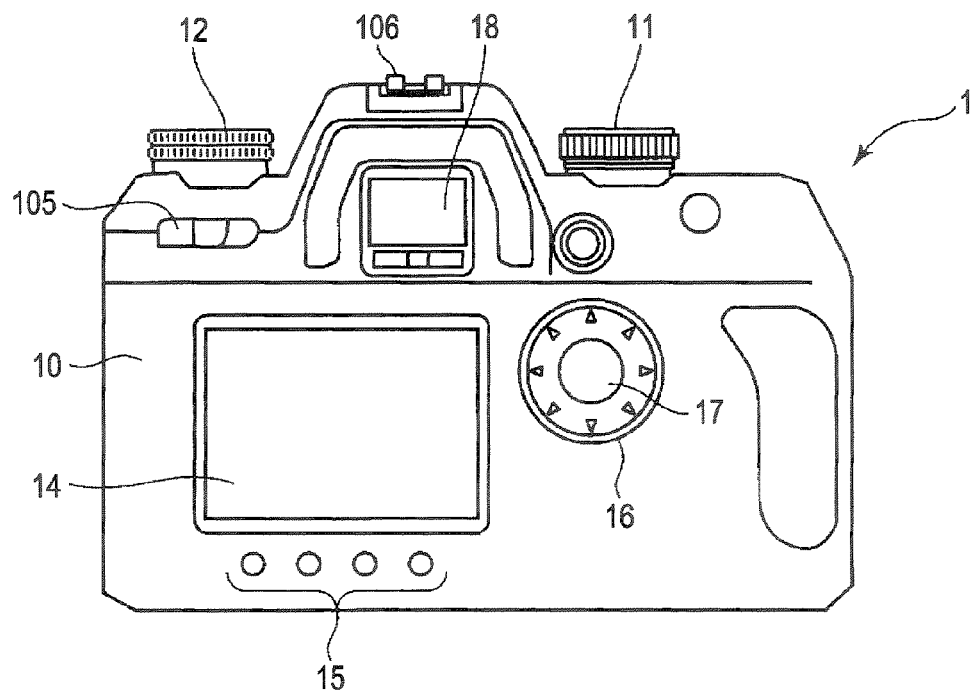
FIG. 2 is a back view of the digital camera shown in FIG. 1.
Figure 3:
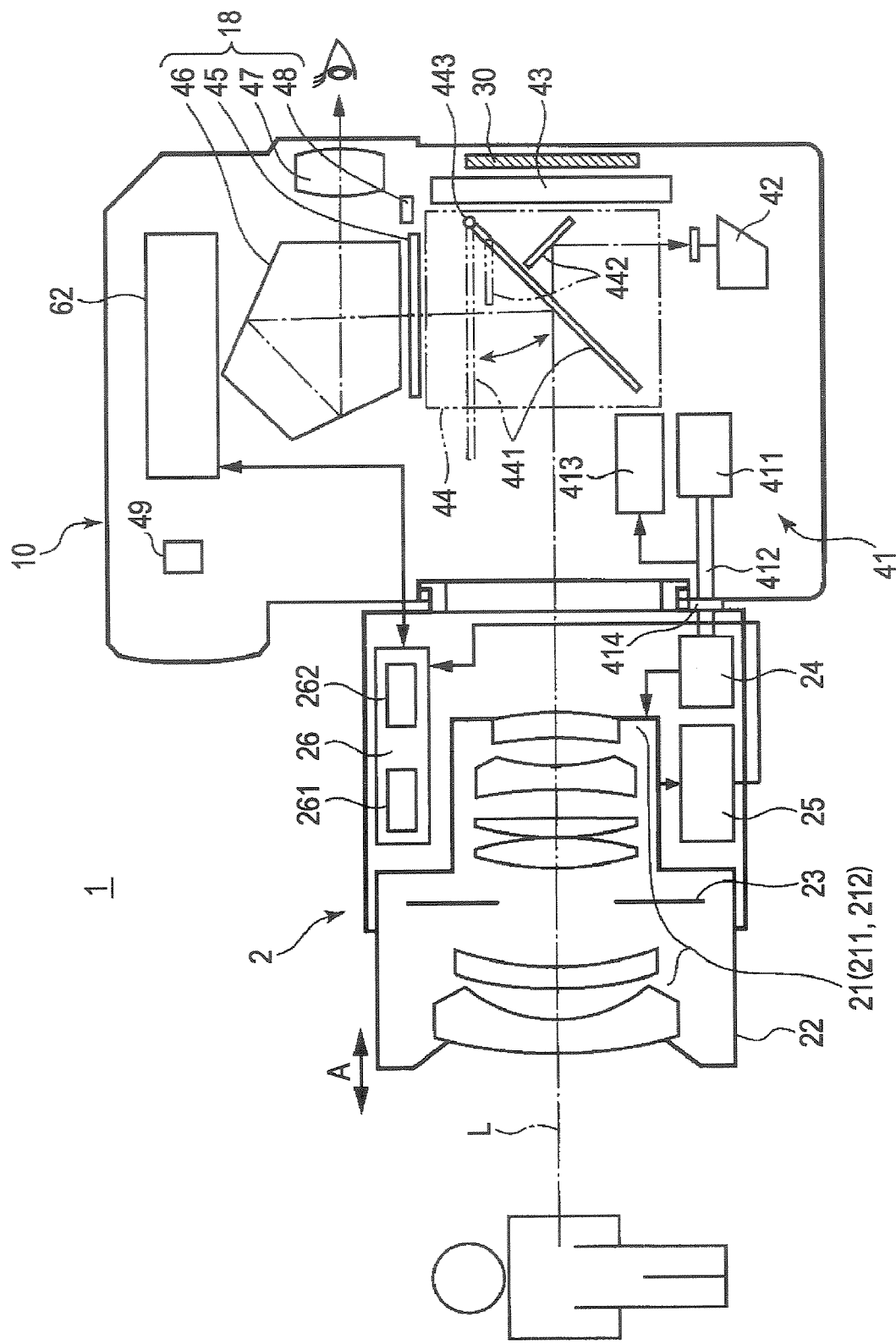
FIG. 3 is a cross-sectional view illustrating the internal structure of the digital camera.

FIGS. 1 and 2 illustrate the external structure of a digital camera (image pickup apparatus) 1 including an image pickup unit according to the present invention. FIG. 1 is a front view of the digital camera 1. FIG. 2 illustrates a back view of the digital camera 1. FIG. 3 is a cross-sectional view illustrating the internal structure of the digital camera 1. As shown in FIG. 1, the digital camera 1 is a digital single-lens reflex camera including a camera body 10 and a photo-taking lens (interchangeable lens) 2 mounted on the camera body 10 at substantially the front center thereof.

As shown in FIG. 1, the camera body 10 includes the following on the front surface: a mounting unit 101 on which the photo-taking lens 2 is mounted, a lens interchanging button 102 disposed on the right side of the mounting unit 101, a grip 103 that extends from the left side of the camera body 10 when viewed from the front (the left in the X direction) and that enables a user to reliably grip (hold) the camera body 10 with one hand or two hands, an AF-assist illuminator 104 disposed on the left side of the mounting unit 101, a mode setting dial 11 disposed at the front upper left corner (at the upper left in the Y direction), a control value setting dial 12 disposed at the front upper right corner, and a shutter button 13 disposed on the top surface of the grip 103.

As shown in FIG. 2, the camera body 10 includes the following on the back surface: a liquid crystal display (LCD) 14 disposed on the left side of the back surface, a setting button group 15 disposed below the LCD 14, a four-way arrow pad 16 disposed on the side of the LCD 14, a push button 17 disposed at the center of the four-way arrow pad 16, an optical finder 18 disposed above the LCD 14, a main switch 105 disposed on the side of the optical finder 18, and a connection port unit 106 disposed above the optical finder 18.

The mode setting dial 11 and the control value setting dial 12 are members having substantially a disk shape. Each of the mode setting dial 11 and the control value setting dial 12 is rotatable in a plane substantially parallel to the top surface of the camera body 10. The mode setting dial 11 is used for selecting one of modes or functions of the digital camera 1. Examples of the mode and function include an auto exposure (AE) mode, an autofocus (AF) mode, a still-image capturing mode for capturing a still image, a continuous shooting mode for capturing a burst of images, and a playback mode for playing back a recorded image. The control value setting dial 12 is used for setting control values of a variety of functions of the digital camera 1.

The shutter button 13 is a press button that allows a user to press the button halfway down and to further press the button fully down. In a still-image capturing mode, when the shutter button 13 is pressed halfway down (S1), a standby operation for capturing a still image of a subject (e.g., setting of an exposure control value and controlling the focus) is performed. When the shutter button 13 is pressed fully down (S2), an image capturing operation is performed. In the image capturing operation, the image sensor is exposed to imaging light. In addition, an image signal obtained through the exposure is subjected to predetermined image processing, and the image signal is stored in, for example, a memory card. Note that the operation to press the shutter button 13 halfway down is detected by a switch S1 (not shown) being turned on, and the operation to press the shutter button 13 fully down is detected by a switch S2 (not shown) being turned on.

The LCD 14 includes a color liquid crystal panel. The LCD 14 plays back and displays an image captured by an image sensor 30 (refer to FIG. 3) or a recorded image. In addition, the LCD 14 displays screens used for setting the functions and the modes of the digital camera 1. An organic electroluminescent (EL) display or a plasma display may be employed in place of the LCD 14.

The setting button group 15 includes buttons used for operating a variety of functions of the digital camera 1. Examples of the buttons in the setting button group 15 include a selection determination switch for determining the selected item in a menu screen displayed on the LCD 14, a selection cancel switch, a menu display switch for switching between menu screens, a display on/off switch, a display magnifying switch, and an image stabilization switch.

The four-way arrow pad 16 includes a ring shaped member having a plurality of circumferentially equiangularly spaced press portions (indicated by triangle marks in the drawing) thereon. A contact point (switch) (not shown) provided to each of the press portions can detect the pressing operation of the press portion. The push button 17 is disposed at the center of the four-way arrow pad 16. The four-way arrow pad 16 and the push button 17 are used for inputting instructions regarding a change in a magnifying factor of a captured image (i.e., changing zoom lens setting towards the wide-angle end or a telephoto end), frame advance of recorded images played back on the LCD 14, and setting of shooting conditions (an aperture value, a shutter speed, and flash lighting).

The optical finder 18 optically displays a captured area of a subject. That is, an image of the subject is led from the photo-taking lens 2 to the optical finder 18. By viewing the image through the optical finder 18, the user (a photographer) can monitor the subject image to be actually captured by the image sensor 30.

The photo-taking lens 2 is mounted on the mounting unit 101. A plurality of electrical contacts (not shown) for electrically connecting the mounted photo-taking lens 2 to the mounting unit 101 and a coupler 414 (refer to FIG. 3) for physically connecting the mounted photo-taking lens 2 to the mounting unit 101 are disposed in the vicinity of the mounting unit 101. The coupler 414 is described in more detail below. The lens interchanging button 102 is pressed in order to dismount the photo-taking lens 2 from the mounting unit 101.

The grip 103 is used for a user to hold the digital camera 1 while the user is capturing an image. Irregularities are formed on the grip 103 so that the grip 103 fits snugly around the hand of the user. A battery container and a card container are provided inside the grip 103. The battery container can contain a battery 69B (refer to FIG. 6) serving as a power supply of the camera. The card container can contain a recording medium (e.g., a memory card 67) for recording image data of a captured image. The grip 103 may include a grip sensor in order to detect whether the user grips the grip 103 or not.

The AF-assist illuminator 104 includes a light emitting element, such as a light emitting diode (LED). When focus control operation is performed in the situation where the luminance or contrast of a subject is small, the AF-assist illuminator 104 emits assistance light.

The main switch 105 is a dual contact slide switch that slides in a horizontal direction. When the main switch 105 is set to the left, the digital camera 1 is powered on. In contrast, when the main switch 105 is set to the right, the digital camera 1 is powered off. The connection port unit 106 is used for connecting an external unit, such as a flash unit (not shown), to the digital camera 1.

As indicated a dotted line in FIG. 1, the digital camera 1 includes a vibration detection sensor 49 at an appropriate location in the camera body 10. The vibration detection sensor 49 detects vibration of the camera body 10 caused by, for example, the hand shake. Let FIG. 1 represent a two-dimensional coordinate system in which an X-axis is the horizontal direction and a Y-axis is the vertical direction. Then, the digital camera 1 includes an X sensor 49a for detecting the camera shake in the X-axis direction and a Y sensor 49b for detecting the camera shake in the Y-axis direction. Each of the X sensor 49a and the Y sensor 49b includes, for example, a gyro having a piezoelectric element and detects the angular velocity of vibration in each of the directions.

The photo-taking lens 2 functions as a lens window that receives light (an optical image) from a subject. In addition, the photo-taking lens 2 forms an image capturing optical system that leads the subject light to the image sensor 30 and the optical finder 18, which are described below. By pressing the lens interchanging button 102, the photo-taking lens 2 can be dismounted from the camera body 10 (an interchangeable image-capturing lens).

The photo-taking lens 2 includes a plurality of lens groups 21 disposed in a line along a light axis L (refer to FIG. 3). The lens groups 21 include a focus lens 211 (refer to FIG. 6) for controlling the focus, and a zoom lens 212 (refer to FIG. 6) for variably magnifying an image. By driving each of the lenses in the light axis L direction, variable magnification and focus control can be performed. The photo-taking lens 2 further includes an operation ring rotatable along the outer peripheral surface of a lens barrel 22 thereof at an appropriate location. The zoom lens 212 moves in the light axis direction by a distance in accordance with the rotational direction and rotational amount of the operation ring through a manual or automatic operation. Thus, a zoom ratio (magnification ratio) corresponding to the position of the zoom lens 212 is set. In the present embodiment, the photo-taking lens 2 is an image-capturing lens having a variable focal length. However, the photo-taking lens 2 may be an image-capturing lens having an invariable (fixed) focal length.

The internal structure of the camera body 10 is described next with reference to FIG. 3. As shown in FIG. 3, the camera body 10 includes the image sensor 30, an AF drive unit 41, a phase difference AF module 42, a shutter unit 43, a mirror box 44, the optical finder 18, the above-described vibration detection sensor 49, and a main control unit 62.

The image sensor 30 (an image pickup device) is disposed on a back surface of the camera body 10 substantially parallel to the back surface. For example, the image sensor 30 is a MOS color area sensor (MOS-based image pickup device) having a plurality of pixels, each including a photodiode, arranged two-dimensionally in a matrix. The MOS color area sensor employs a Bayer arrangement in which color filters having different spectral sensitivities (e.g., R (red), G (green), and B (blue) color filters) are disposed on a light receiving surface of each of the pixels in a number ratio of 1:2:1. The image sensor 30 converts an optical image formed by the lens groups 21 to an analog electrical signal (image signal) of each of R (color), G (green), and B (blue) color components and outputs these image signals of R, G, B colors.

The AF drive unit 41 includes an AF actuator 411, an output shaft 412, and an encoder 413. The AF actuator 411 generates a driving force for an AF operation. The AF actuator 411 includes a motor (e.g., a DC motor, a stepping motor, or an ultrasonic motor) and a reduction gear system (not shown) for providing the motor with a lower gear ratio. The output shaft 412 transfers the driving force output from the AF actuator 411 to a lens driving mechanism 24 in the photo-taking lens 2. The encoder 413 detects a driving amount (rotational amount) of the AF actuator 411 transferred to the output shaft 412. The detected rotational amount is used for computing the position of the lens groups 21 in the photo-taking lens 2. The output shaft 412 is mechanically connected to the lens driving mechanism 24 via the coupler 414.

The phase difference AF module 42 is disposed on the bottom surface of the mirror box 44. The phase difference AF module 42 detects a focusing position using a known phase difference detection method.

Figure 4:
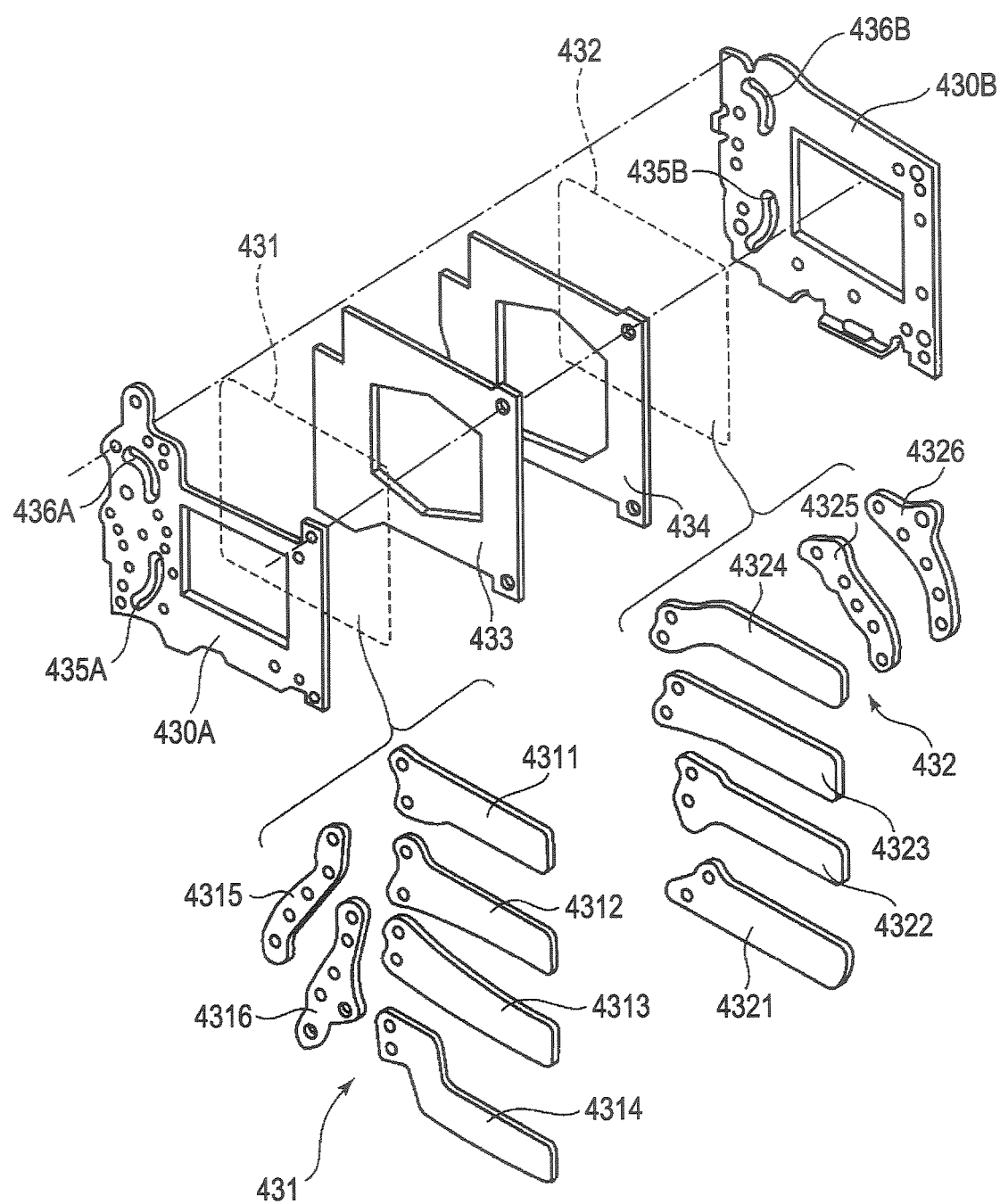
FIG. 4 is an exploded perspective view illustrating the structure of a shutter unit.
Figure 5:
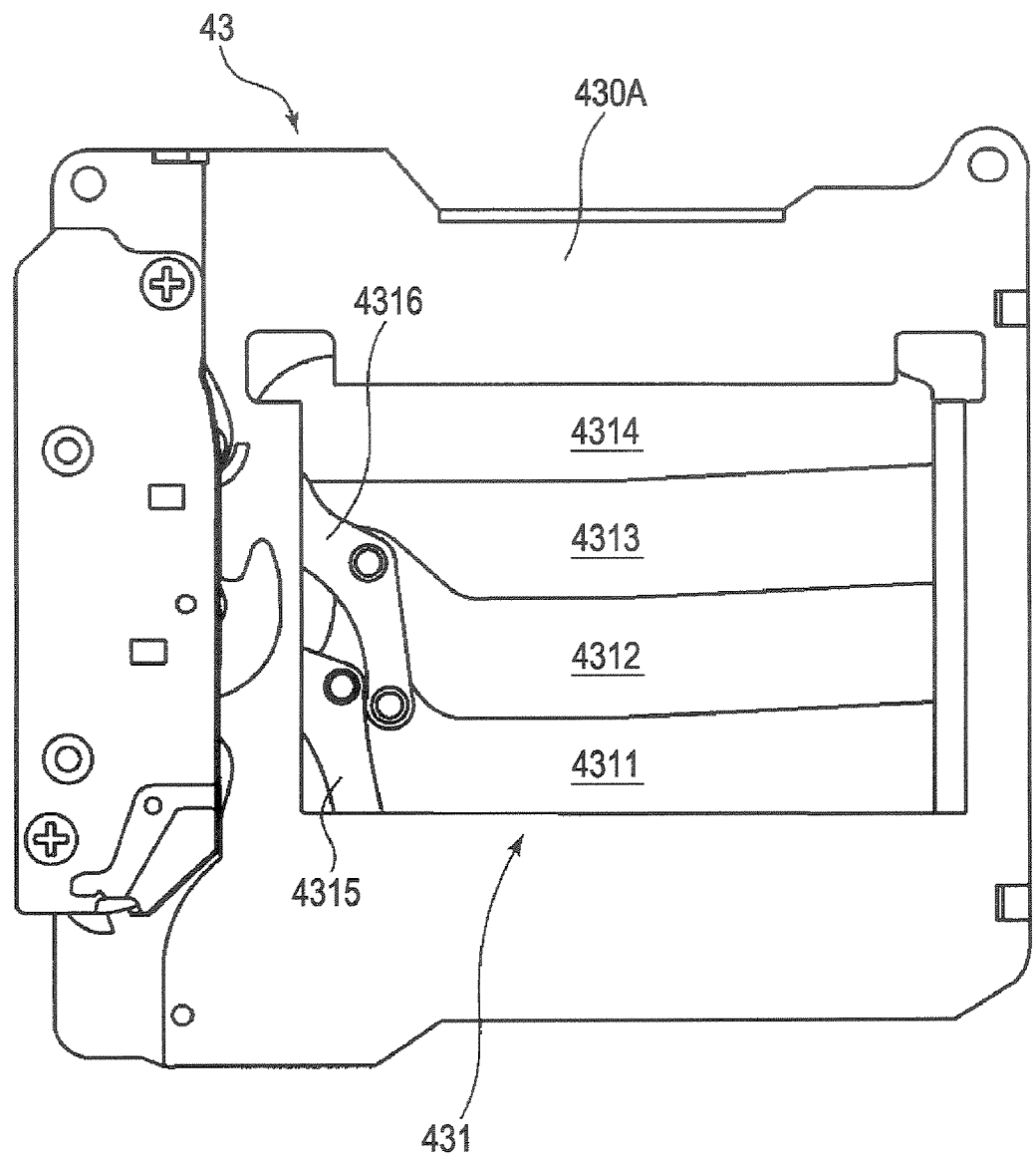
FIG. 5 is a front view of the shutter unit.

The shutter unit 43 is composed of a mechanical focal plane shutter having a curtain that moves in a direction perpendicular to a predetermined pixel line of the image sensor 30. The focal plane shutter blocks the propagation of light led to the image sensor 30. The shutter unit 43 is disposed between the back surface of the mirror box 44 and the image sensor 30. FIG. 4 is an exploded perspective view of the shutter unit 43. The shutter unit 43 includes a pair of shutter plates 430A and 430B. A first curtain group 431, a second curtain group 432, a light shielding plate 433, and an intermediate plate 434 are disposed between the shutter plates 430A and 430B.

The first curtain group 431 includes four separate curtains 4311 to 4314 (a curtain). These separate curtains 4311 to 4314 are connected to each other by two first curtain arms 4315 and 4316. The first curtain arms 4315 and 4316 are driven by a drive unit (a shutter driving actuator 43M shown in FIG. 6) having a drive shaft configured such that the separate curtains 4311 to 4314 enter an expanding state (a "shutter open" state) or an overlap state (a "shutter closed" state). Similarly, the second curtain group 432 includes four separate curtains 4321 to 4324. These separate curtains 4321 to 4324 are connected to each other by two second curtain arms 4325 and 4326. Each of the light shielding plate 433 and the intermediate plate 434 has a predetermined opening that allows subject light to pass therethrough. In addition, circular arc grooves 435A and 436A and circular arc grooves 435B and 436B in which the drive shaft of the drive unit is inserted and disposed are formed in the shutter plates 430A and 430B, respectively.

According to the present embodiment, the digital camera 1 provides a reset signal to each of the pixels of the image sensor 30 at a predetermined timing. Thus, an electronic focal plane shutter that starts the exposure operation of the image sensor 30 is used for a first curtain of the exposure operation. In addition, the shutter unit 43, which is a mechanical focal plane shutter, is mainly used for a second curtain. Accordingly, the first curtain group 431 usually enters a "shutter open" state earlier than a start time of the exposure operation. However, in the case of long exposure, the first curtain group 431 may be used instead of using the electronic focal plane shutter as a first curtain.

Referring back to FIG. 3, the mirror box 44 includes a quick return mirror 441 and a sub-mirror 442. The quick return mirror 441 is pivotable about a pivotal axis 443 between a position in which, as indicated by a solid line of FIG. 3, the quick return mirror 441 is at an angle of about 45° with respect to the light axis L of the lens groups 21 of the image capturing optical system (hereinafter referred to as an "inclined position") and a position in which, as shown by a chain double-dashed line of FIG. 3, the quick return mirror 441 is substantially parallel to the bottom surface of the camera body 10 (hereinafter referred to as a "horizontal position").

The sub-mirror 442 is disposed on a back surface side of the quick return mirror 441 (on a side adjacent to the image sensor 30). The sub-mirror 442 is displaceable in conjunction with the quick return mirror 441 between a position in which, as indicated by a solid line of FIG. 3, the sub-mirror 442 is at an angle of about 90° with respect to the quick return mirror 441 in the inclined position (hereinafter referred to as an "inclined position") and a position in which, as shown by a chain double-dashed line of FIG. 3, the sub-mirror 442 is substantially parallel to the quick return mirror 441 in the horizontal position (hereinafter referred to as a "horizontal position"). The quick return mirror 441 and the sub-mirror 442 are driven by a mirror driving actuator 44M (refer to FIG. 6), which is described in more detail below.

When the quick return mirror 441 and the sub-mirror 442 are in the inclined positions, the quick return mirror 441 reflects most of the subject light beam traveling along the light axis L towards the optical finder 18 (a focusing glass 45). The quick return mirror 441 allows the other light beam to pass therethrough. The sub-mirror 442 guides the light beam that has passed through the quick return mirror 441 to the phase difference AF module 42. At that time, the optical finder 18 displays a subject image, and the phase difference AF module 42 performs a focus control operation using a phase difference detection method. However, since no light beams are guided to the image sensor 30, the LCD 14 does not display a subject image.

In contrast, when return mirror 441 and the sub-mirror 442 are in the horizontal positions, the quick return mirror 441 and the sub-mirror 442 move from the light axis L. Accordingly, all the subject light beam traveling along the light axis L is led to the image sensor 30. At that time, the LCD 14 displays a subject image. However, the optical finder 18 does not display a subject image and the phase difference AF module 42 does not perform a focus control operation using a phase difference detection method.

The optical finder 18 is disposed in the upper portion of the mirror box 44, which is disposed in substantially the middle of the camera body 10. The optical finder 18 includes the focusing glass 45, a prism 46, an eyepiece lens 47, and a finder display element 48. The prism 46 inverts the image on the focusing glass 45 left to right, and the eyepiece lens 47 delivers the image to the eye of a photographer. Thus, the photographer can monitor the subject image. The finder display element 48 displays, for example, a shutter speed, an aperture value, and an exposure correction value in the lower section of a display screen provided in the finder frame.

The vibration detection sensor 49 corresponds to the vibration detection sensor 49 (the X sensor 49a and the Y sensor 49b) shown in FIG. 1. Note that, in FIG. 3, the X sensor 49a and the Y sensor 49b are integrated into one.

Referring back to FIG. 3, the main control unit 62 includes a microcomputer incorporating a storage unit (e.g., a ROM for storing a control program and a flash memory for temporarily storing data). The main control unit 62 is described in more detail below.

The photo-taking lens 2 to be mounted on the camera body 10 is described next. The photo-taking lens 2 includes the lens groups 21, the lens barrel 22, the lens driving mechanism 24, a lens position detecting unit 25, and a lens control unit 26, all of which form the image capturing optical system.

In the lens barrel 22, the lens groups 21 includes the focus lens 211, the zoom lens 212 (refer to FIG. 6), and an aperture 23 for controlling an amount of light made incident on the image sensor 30 in the camera body 10. The focus lens 211, the zoom lens 212, and the aperture 23 are arranged along the direction of the light axis L. The lens groups 21 receives the optical image of a subject and focuses the optical image on, for example, the image sensor 30. A change in the magnification factor (the focal length) or a focus control operation is performed by moving the lens groups 21 in the light axis L direction using the AF actuator 411 in the camera body 10.

The lens driving mechanism 24 includes a helicoid and a gear (not shown) for rotating the helicoids. The lens driving mechanism 24 receives a driving force from the AF actuator 411 via the coupler 414 so as to move the entire lens groups 21 in a direction indicated by arrow A that is parallel to the light axis L. The direction in which the lens groups 21 moves and the travel distance are determined by the rotational direction and the number of revolutions of the AF actuator 411.

The lens position detecting unit 25 includes an encode plate having a plurality of code patterns within the moving range of the lens groups 21 in the light axis L direction and an encoder brush that moves together with the lens barrel 22 while being in sliding contact with the encode plate. The lens position detecting unit 25 detects a change in the focal length of the lens groups 21. The lens position detecting unit 25 transmits the detected information to the lens control unit 26, which is described in more detail below.

The lens control unit 26 includes a microcomputer incorporating a storage unit 261 (e.g., a ROM for storing a control program and a flash memory for storing data associated with state information). The storage unit 261 is a memory unit incorporated in an interchangeable lens. The lens control unit 26 further includes a communication unit 262 that communicates with the main control unit 62 of the camera body 10. The communication unit 262 sends state information data (e.g., the focal length of the lens groups 21, the position of the exit pupil, an aperture value, a focusing distance, and the peripheral brightness) to the main control unit 62. In addition, the communication unit 262 receives, for example, data about a driving distance of the focus lens 211 from the main control unit 62. At an image capture time, the communication unit 262 sends data, such as focal length information after the AF operation is completed and an aperture value, to the main control unit 62. The storage unit 261 stores, for example, the above-described state information data of the lens groups 21 and the driving distance of the focus lens 211 sent from the main control unit 62.

Description of Electrical Configuration of Digital Camera

Figure 6:
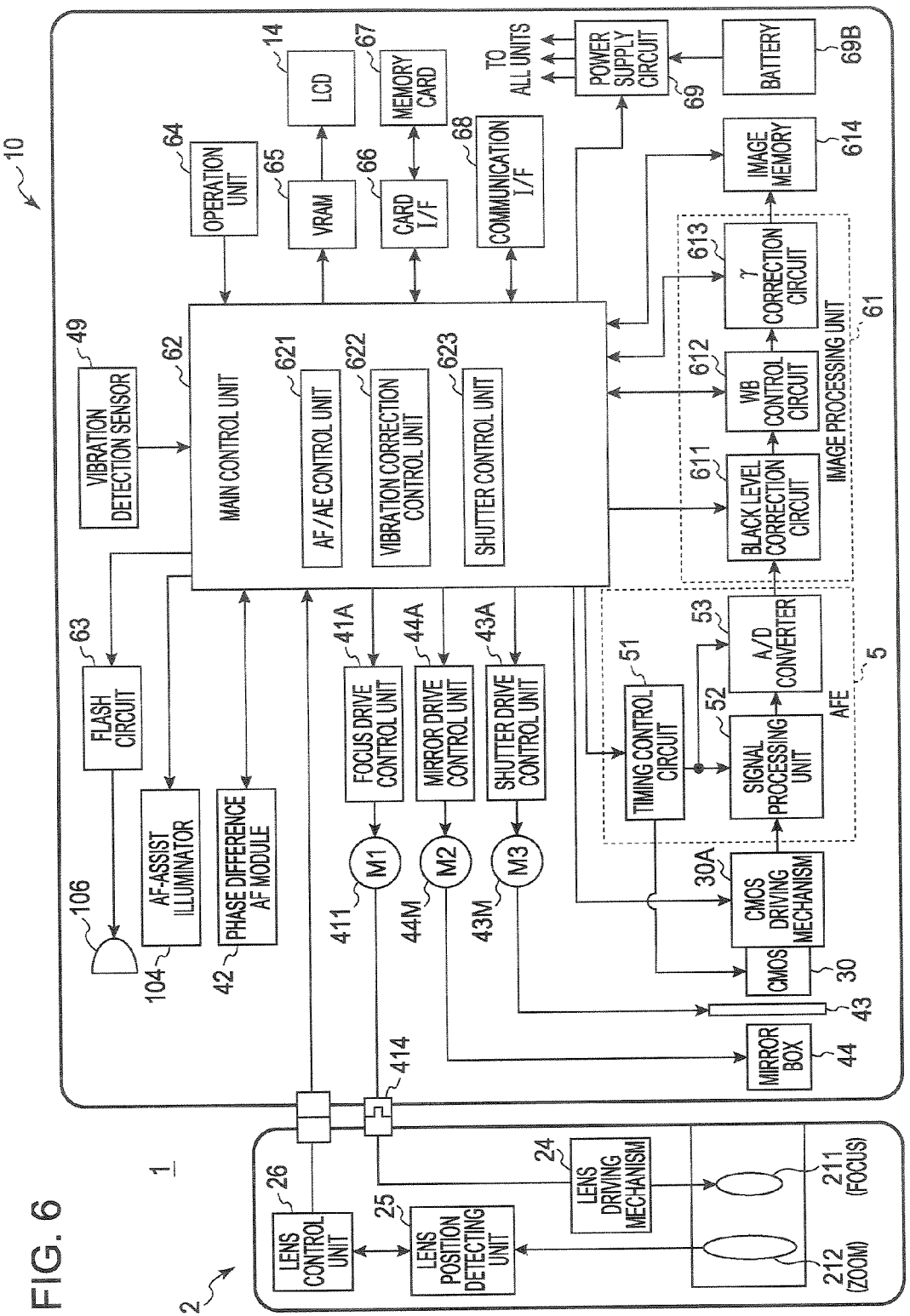
FIG. 6 is a block diagram of the electrical configuration of the digital camera having a photo-taking lens mounted on the camera body thereof.

The electrical configuration of the digital camera 1 according to the present embodiment is described next. FIG. 6 is a block diagram of the electrical configuration of the digital camera 1 when the photo-taking lens 2 is mounted on the camera body 10. Similar reference numerals and letters refer to similar components in FIGS. 1 to 3. Since the electrical configuration of the photo-taking lens 2 is described above, the electrical configuration of the camera body 10 is hereinafter particularly described.

In addition to the image sensor 30 and the like, which are described with reference to FIGS. 1 to 3, the camera body 10 includes a MOS driving mechanism 30A, an analog front end (AFE) 5, an image processing unit 61, an image memory 614, a main control unit 62 (including first control means), a flash circuit 63, an operation unit 64, a VRAM 65, a card I/F 66, a memory card 67, a communication I/F 68, a power supply circuit 69, a battery 69, a focus drive control unit 41A, a shutter drive control unit 43A (second control means), the shutter driving actuator 43M, a mirror drive control unit 44A, and the mirror driving actuator 44M.

Figure 7:
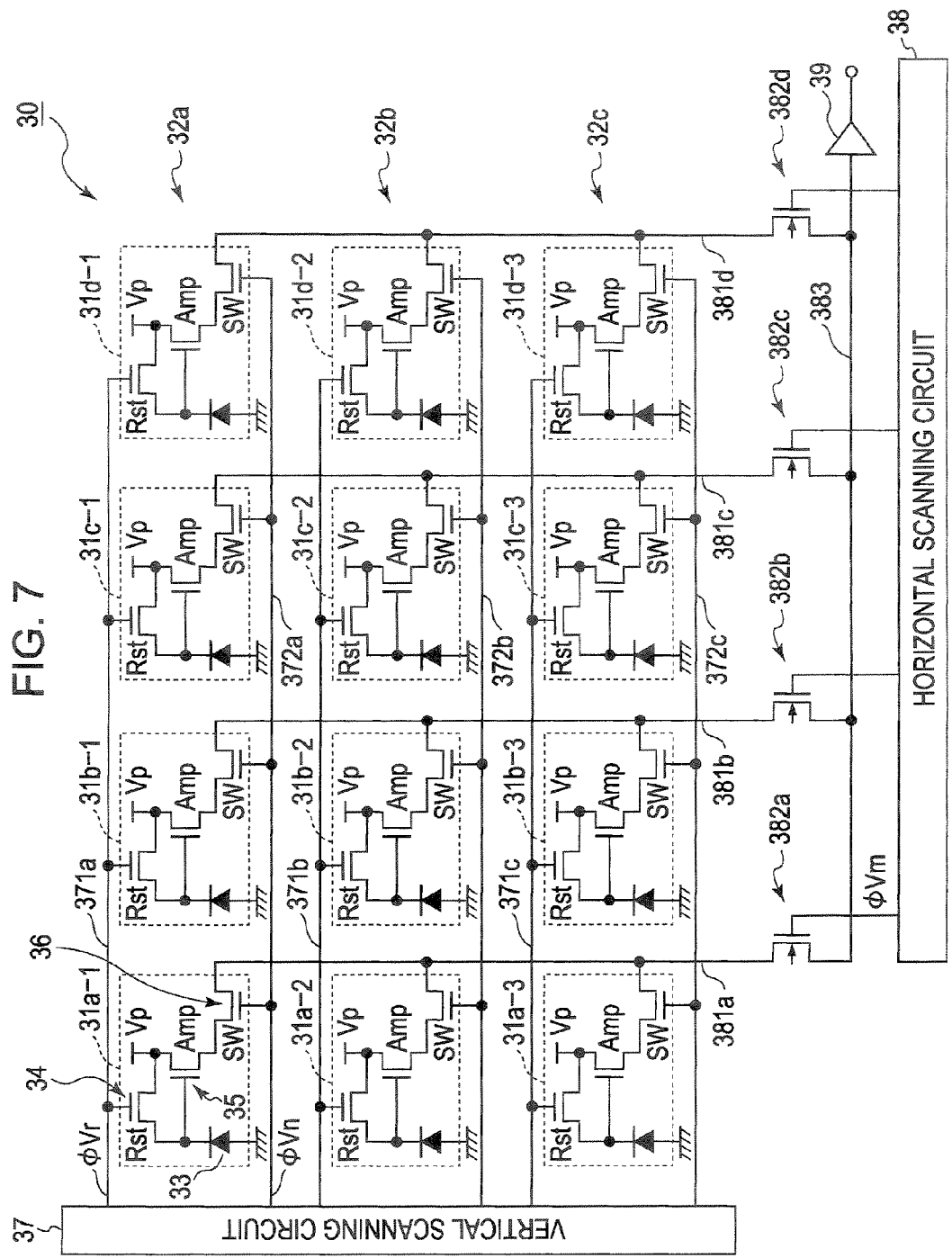
FIG. 7 is a circuit block diagram schematically illustrating the circuit configuration of an image sensor.

As noted earlier, the image sensor 30 is a MOS color area sensor. As described below, a timing control circuit 51 controls the image capturing operation, such as start (and end) of the exposure operation performed by the image sensor 30, selection of an output of a pixel of the image sensor 30, and readout of a pixel signal. FIG. 7 is a circuit block diagram schematically illustrating the circuit configuration of the image sensor 30. For convenience of drawing, only a pixel group of 3 rows (lines)×4 columns is shown in FIG. 7.

The image sensor 30 includes a plurality of pixels 31 (31a-1 to 31a-3) arranged in a plurality of pixel lines 32 (32a to 32c) (i.e., in a matrix arrangement). FIG. 7 illustrates an example in which the pixels 31a-1, 31b-1, 31c-1, and 31d-1 are disposed in the first pixel line 32a, the pixels 31a-2, 31b-2, 31c-2, and 31d-2 are disposed in the second pixel line 32b, and the pixels 31a-3, 31b-3, 31c-3, and 31d-3 are disposed in the third pixel line 32c. Each of the pixels 31 includes a photodiode 33 functioning as a photoelectric transducer, a reset switch (Rst) 34 for discharging a charge accumulated in the pixel 31 in response to a reset signal, an amplifying element (Amp) 35 for reading out the charge accumulated in the pixel 31 in the form of a voltage (charge-voltage conversion) and amplifying the voltage, and a vertical selection switch (SW) 36 for outputting a pixel signal of the pixel 31 in response to a selection signal. The reset switch 34 and the amplifying element 35 are connected to a power supply Vp.

The image sensor 30 further includes a vertical scanning circuit 37, a horizontal scanning circuit 38, and an amplifier 39. Reset lines 371a to 371c and vertical scanning lines 372a to 372c are connected to the vertical scanning circuit 37. The reset switches 34 of the pixels 31a-1 to 31d-3 in each of the pixel lines 32a to 32c are each connected to a corresponding one of the reset lines 371a to 371c. Control electrodes of the vertical selection switches 36 of the pixels 31a-1 to 31d-3 in each of the pixel lines 32a to 32c are each connected to a corresponding one of the vertical scanning lines 372a to 372c. The vertical scanning circuit 37 sequentially supplies a reset signal φVr to the pixel lines 32a to 32c via the reset lines 371a to 371c at predetermined reset timings so that pixels among the pixels 31a-1 to 31d-3 in each of the pixel lines 32a to 32c perform a reset operation. In addition, the vertical scanning circuit 37 supplies a vertical scanning pulse φVn to each of the pixels 31a-1 to 31d-3.

Furthermore, one of horizontal scanning lines 381 (381a to 381d) extend from one of the pixel columns (e.g., the pixels 31a-1, 31a-2, and 31a-3). Main electrodes of the vertical selection switches 36 in each of the pixel columns are connected to the corresponding one of the horizontal scanning lines 381. The horizontal scanning lines 381 are connected to a horizontal signal line 383 via horizontal switches 382 (382a to 382d). The horizontal scanning circuit 38 is connected to control electrodes of the horizontal switches 382a to 382d. By supplying a horizontal scanning pulse φVm to the control electrodes, the horizontal scanning circuit 38 retrieves a pixel signal of the selected pixel. The amplifier 39 is connected to the horizontal signal line 383. The amplifier 39 amplifies a signal output from the pixel.

In the image sensor 30 having such a configuration, an output (readout) operation of a charge accumulated in each of the pixels 31a-1 to 31d-3 can be performed on a pixel-by-pixel basis. In addition, by controlling the operations of the vertical scanning circuit 37 and the horizontal scanning circuit 38, a particular one of the pixels can be selected and the pixel signal of the selected pixel can be output. That is, the vertical scanning circuit 37 supplies a vertical scanning pulse φVn to the vertical selection switch 36 of a given pixel so that the electrical charge (pixel signal) photoelectrically converted by the photodiode 33 in the photodiode 33 of the pixel enters a state in which the pixel signal is outputtable via the horizontal scanning line 381. Subsequently, the horizontal scanning circuit 38 supplies a horizontal scanning pulse φVm to one of the horizontal switches 382 connected to that horizontal scanning line 381 so that the pixel signal is output to the horizontal signal line 383 via the horizontal switch 382. This operation is sequentially performed for each of the pixels. In this way, by sequentially selecting the pixels, the pixel signals can be sequentially output from all the pixels. The pixel signal output to the horizontal signal line 383 is further amplified by the amplifier 39 and is output to the AFE 5.

According to the present embodiment, the digital camera 1 employs an electronic focal plane shutter for a first curtain. Accordingly, the time when the reset signal φVr is supplied to the reset switches 34 of the pixels 31 is an exposure start time for the pixels 31. That is, when the reset signal φVr is supplied to the reset switch 34, the reset switch 34 turns on. Thus, an unwanted accumulated charge is discarded. Thereafter, the reset switch 34 turns off. Thus, the pixels 31 enter a state in which the pixels 31 can accumulate a charge in accordance with exposure to the pixels 31. In an example circuit configuration shown in FIG. 7, since the reset signal φVr is supplied to one of the pixel lines 32a to 32c at a certain time, exposure is sequentially started for the pixel lines 32a to 32c.

Figure 8:
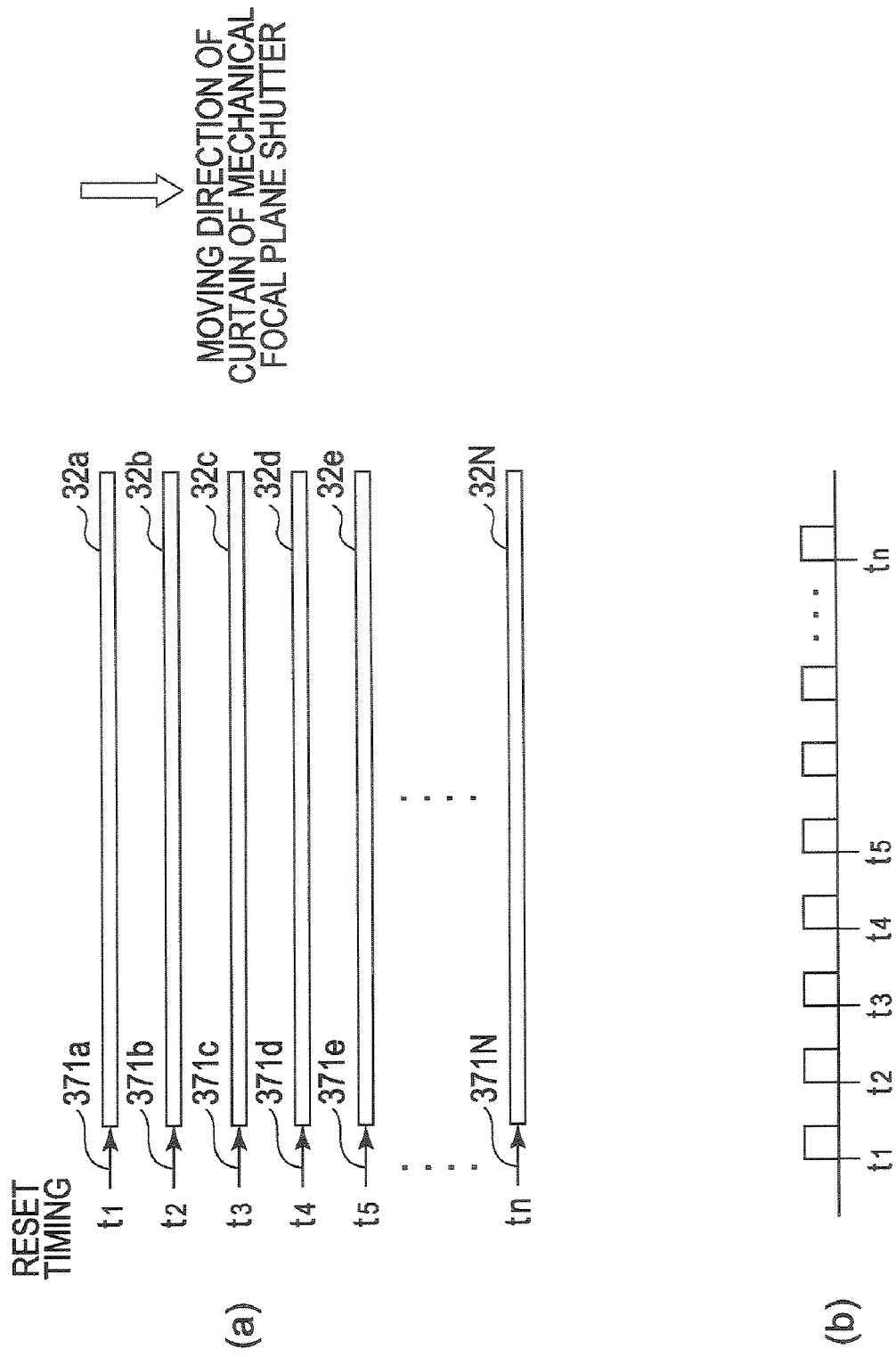
FIG. 8 is a schematic illustration of the operation of an electronic focal plane shutter.

FIG. 8 is a schematic illustration of such an operation of the electronic focal plane shutter. In a case (a) of FIG. 8, the first pixel line 32a to the Nth pixel line 32N are shown. Reset lines 371a to 371N that deliver the reset signal φVr to these pixel lines are indicated by arrows. The first pixel line 32a to the Nth pixel line 32N are pixel lines in which pixels are arranged in a direction perpendicular to a moving direction of the curtain of the mechanical focal plane shutter.

In such a configuration, the reset signal φVr shown in a case (b) of FIG. 8 is sequentially supplied from the vertical scanning circuit 37 to the first pixel line 32a to the Nth pixel line 32N via the reset lines 371a to 371N at a predetermined reset timing. That is, the reset signal φVr is simultaneously supplied to the pixels 31a-1 to 31d-1 in the first pixel line 32a at a time t1. Thus, exposure of the pixels 31a-1 to 31d-1 is started. Subsequently, the reset signal φVr is simultaneously supplied to the pixels 31a-2 to 31d-2 in the second pixel line 32b at a time t2. Thus, exposure to the pixels 31a-2 to 31d-2 is started. In the same manner, at times t3, t4, t5, . . . tn, the reset signal φVr is sequentially supplied to the third pixel line 32c, the fourth pixel line 32d, the fifth pixel line 32e, . . . the Nth pixel line 32N, respectively. Thus, exposure to the first pixel line 32a to the Nth pixel line 32N is sequentially started so that the electronic focal plane shutter is achieved.

In such a configuration, the reset timings (the timings at which the reset signal φVr is sequentially supplied to the first pixel line 32a to the Nth pixel line 32N) determine the curtain speed of the electronic focal plane shutter. That is, as the time period from the time t1 to tn decreases, the shutter speed increases. In addition, if the intervals between adjacent pairs of times t1, t2, t3 . . . tn are constant, the curtain speed is constant. In the present embodiment, the curtain speed of the first curtain achieved by the electronic focal plane shutter is not constant. As described hereinafter, the main control unit 62 performs control so that the curtain speed gradually increases and reaches the maximum speed at the end of the operation.

Referring back to FIG. 6, the MOS driving mechanism 30A drives the image sensor 30 in order to compensate vibration in accordance with, for example, camera shake applied to the camera body 10. The MOS driving mechanism 30A includes an impact actuator using a piezoelectric element and an X-axis actuator and Y-axis actuator using a stepping motor. The MOS driving mechanism 30A is controlled by the main control unit 62.

The AFE 5 supplies a timing pulse to the image sensor 30 in order to cause the image sensor 30 to perform a predetermined operation. In addition, the AFE 5 performs predetermined signal processing on an image signal output from the image sensor 30 (an analog signal group received by the pixels of the MOS area sensor) and converts the image signal into a digital format. Thereafter, the AFE 5 outputs the image signal to the image processing unit 61. The AFE 5 includes the timing control circuit 51, a signal processing unit 52, and an A/D converter 53.

The timing control circuit 51 generates predetermined timing pulses (pulses for generating the vertical scanning pulse φVn, the horizontal scanning pulse φVm, and the reset signal φVr) on the basis of a reference clock output from the main control unit 62. Subsequently, the timing control circuit 51 outputs the generated timing signals to the image sensor 30 (e.g., the vertical scanning circuit 37 and the horizontal scanning circuit 38) so as to control the imaging operation of the image sensor 30. In addition, by outputting predetermined timing pulses to the signal processing unit 52 and the A/D converter 53, the timing control circuit 51 controls the operations of the signal processing unit 52 and the A/D converter 53.

The signal processing unit 52 performs predetermined analog signal processing on the analog image signal output from the image sensor 30. The signal processing unit 52 includes a correlated double sampling (CDS) circuit, an auto gain control (AGC) circuit, and a clamp circuit (clamp means). The A/D converter 53 converts the analog R, G, and B image signals output from the signal processing unit 52 to a multi-bit (e.g., 12-bit) digital image signal on the basis of a timing pulse output from the timing control circuit 51.

The image processing unit 61 performs predetermined signal processing on the image data output from the AFE 5 so as to generate an image file. The image processing unit 61 includes a black level correction circuit 611, a white balance control circuit 612, and a gamma correction circuit 613. The image data input to the image processing unit 61 is temporarily written to the image memory 614 in synchronization with the readout from the image sensor 30. Thereafter, the image processing unit 61 accesses the written image data in the image memory 614 so that each of blocks of the image processing unit 61 performs the processing thereof.

The black level correction circuit 611 corrects the black level of each of the R, G, and B digital signals A/D-converted by the A/D converter 53 to a reference black level.

The white balance control circuit 612 changes the level of each of R (red), G (green), and B (blue) components of the digital signal on the basis of a reference white level in accordance with a light source (performs white balance (WB) adjustment). That is, the white balance control circuit 612 identifies portions of a subject which are estimated to be white using the brightness and saturation. Thereafter, the white balance control circuit 612 computes the average value of each of the R, G, and B color components for the portions, the G/R ratio, and the G/B ratio on the basis of WB adjustment data supplied from the main control unit 62. These data are used as correction gains. Thus, the levels are corrected.

The gamma correction circuit 613 corrects the gradation characteristic of the image data subjected to the WB adjustment. More specifically, the gamma correction circuit 613 nonlinearly converts the level of the image data for each of the color components using a predetermined gamma correction table. In addition, the gamma correction circuit 613 adjusts the offset.

The image memory 614 temporarily stores image data output from the image processing unit 61 in an image capturing mode. In addition, the image memory 614 is used for a working area when the main control unit 62 performs predetermined processing on the image data. Furthermore, in a playback mode, the image memory 614 temporarily stores image data read out from the memory card 67.

The main control unit 62 controls the operation of each of the units of the digital camera 1 shown in FIG. 6. According to the present embodiment, the main control unit 62 functionally includes an AF/AE control unit 621, a vibration correction control unit 622, and a shutter control unit 623.

The AF/AE control unit 621 performs control required for autofocus control (AF) and auto exposure control (AE). That is, for AF, the AF/AE control unit 621 performs focus control processing using a signal output from the phase difference AF module 42 and a phase difference detection method so as to generate a focus control signal (an AF control signal). The AF/AE control unit 621 operates the AF actuator 411 via the focus drive control unit 41A. In this way, the AF actuator 411 drives the focus lens 211. In addition, for AE, the AF/AE control unit 621 computes an exposure value optimal for the subject on the basis of the luminance information about the subject detected by an AE sensor (not shown).

In a vibration correction mode, the vibration correction control unit 622 computes the direction and the amount of vibration on the basis of the vibration detection signal output from the vibration detection sensor 49. Subsequently, the vibration correction control unit 622 generates a vibration correction control signal on the basis of the computed direction and the amount of the vibration and outputs the generated vibration correction control signal to the MOS driving mechanism 30A. In this way, the MOS driving mechanism 30A moves the image sensor 30 in a direction in which the camera shake is canceled.

The shutter control unit 623 controls the shutter operations of the mechanical focal plane shutter and the electronic focal plane shutter. The shutter control unit 623 is described in more detail below with reference to FIG. 18.

In a flash image capturing mode, the flash circuit 63 controls an amount of light emitted from a flash connected to the connection port unit 106 so as to be a predetermined amount of light set by the main control unit 62.

The operation unit 64 includes the mode setting dial 11, the control value setting dial 12, the shutter button 13, the setting button group 15, the four-way arrow pad 16, the push button 17, and the setting button group 15. The operation unit 64 is used for inputting operational information to the main control unit 62.

The VRAM 65 has a memory size of an image signal corresponding to the number of pixels of the LCD 14. The VRAM 65 serves as a buffer memory located between the main control unit 62 and the LCD 14. The card I/F 66 is an interface for enabling signal exchange between the memory card 67 and the main control unit 62. The memory card 67 stores image data generated by the main control unit 62. The communication I/F 68 is an interface for enabling transfer of image data to a personal computer and other external apparatuses.

The power supply circuit 69 includes, for example, a constant-voltage circuit. The power supply circuit 69 generates a voltage (e.g., 5V) for driving a control unit including the main control unit 62, the image sensor 30, and a variety of driving units in the digital camera 1. Power supply to the image sensor 30 is controlled by a control signal supplied from the main control unit 62 to the power supply circuit 69. The battery 69B is a primary battery, such as an alkaline battery or a secondary battery, such as a nickel hydride battery. The battery 69B supplies electrical power to all of the components of the digital camera 1.

The focus drive control unit 41A generates a drive control signal that controls the AF actuator 411 to move the focus lens 211 to a focusing position on the basis of an AF control signal supplied from the AF/AE control unit 621 of the main control unit 62.

The shutter driving actuator 43M is an actuator that opens and closes the shutter unit 43 (the first curtain group 431 and the second curtain group 432 shown in FIG. 4). The shutter drive control unit 43A (the second control means) generates a drive control signal that drives the shutter driving actuator 43M on the basis of a control signal supplied from the main control unit 62. A control signal that drives the second curtain group 432 functions as a control signal that completes the exposure operation of the image sensor 30.

The mirror driving actuator 44M is an actuator that rotates the quick return mirror 441 in the mirror box 44 to the horizontal position or the inclined position. The mirror drive control unit 44A generates a driving signal for driving the mirror driving actuator 44M in synchronization with the image capturing timing.

Description of Shutter Operation

Figure 10:
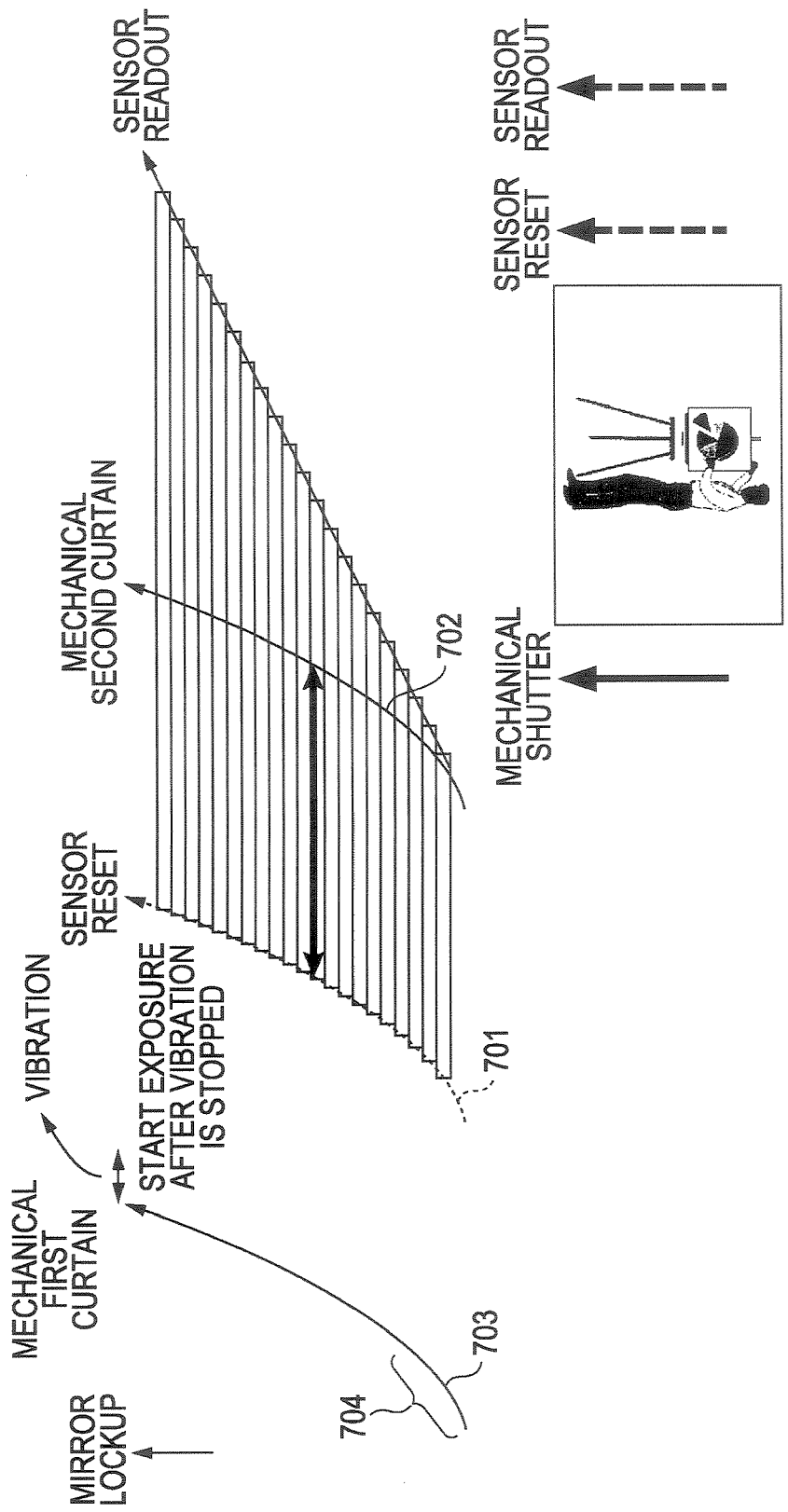
FIG. 10 is a schematic illustration of an operation in which the electronic focal plane shutter is used for a first curtain.

According to the present embodiment, as shown in FIG. 10, the digital camera 1 employs the electronic focal plane shutter for a first curtain (refer to "sensor reset" indicated by a reference numeral 701) and employs the mechanical focal plane shutter for a second curtain (refer to "mechanical second curtain" indicated by a reference numeral 702). In this way, the exposure operation of the MOS image sensor 30 can be started and ended. However, when the electronic focal plane shutter is always used for a first curtain, the following problems [1] and [2] occur.

[1] Problem of Unevenness of Exposure at High SS

Figure 9:
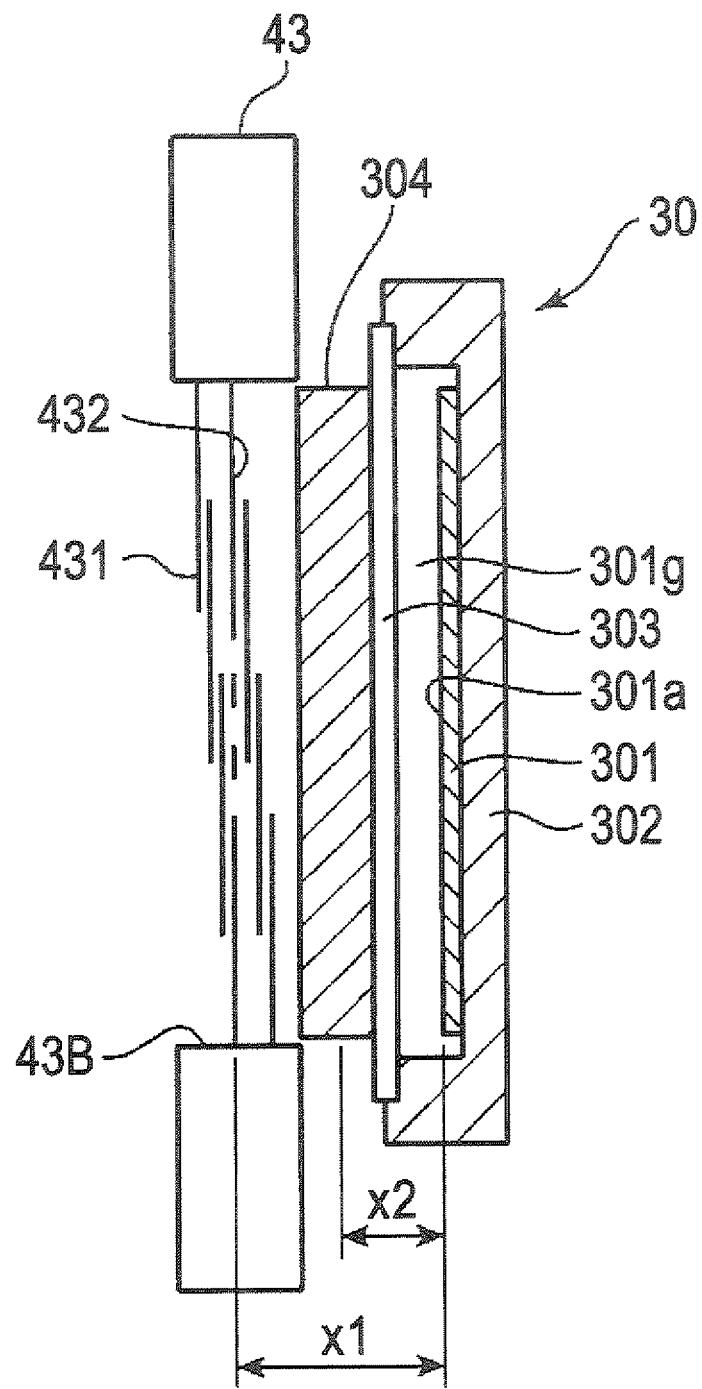
FIG. 9 is a cross-sectional view illustrating a positional relationship between an image sensor and the shutter unit.

FIG. 9 is a cross-sectional view illustrating a positional relationship between the image sensor 30 and the shutter unit 43. In general, as shown in FIG. 9, in the image sensor 30, a MOS sensor chip 301 is incorporated in a holder 302 having a storage recess. A predetermined gap 301g is provided on the side of a light receiving surface 301a of the MOS sensor chip 301. A cover glass 303 covers and shields the opening of the holder 302. Furthermore, in general, an optical lowpass filter 304 is disposed between the image sensor 30 and the shutter unit 43 in order to remove a high-frequency component of the subject light and prevent the occurrence of a moiré pattern. For example, a birefringent low-pass filter using a quartz crystal having a predetermined adjusted crystal axis or a phase lowpass filter that achieves a required optical cutoff frequency characteristic using the diffraction effect can be used for the optical lowpass filter 304. In such a structure, the subject light ray passes through an image frame 43B of the shutter unit 43, the optical lowpass filter 304, the cover glass 303, and the gap 301g and reaches the light receiving surface 301a of the MOS sensor chip 301.

In such a structure, the shutter speed of the curtain (the first curtain group 431 and the second curtain group 432) in the shutter unit 43 is not constant from the expanding state to the overlap state. A curve indicated by a reference numeral 703 in FIG. 10 represents the running characteristic of a curtain (a curtain speed characteristic 703) serving as the "mechanical first curtain". As indicated by the curtain speed characteristic 703, from the start point (an area indicated by a reference numeral 704) to the end point in the image frame, the curtain speed of the mechanical focal plane shutter is low at first. The curtain speed is gradually increased, and is the highest at the end point. The curtain speed characteristic of a mechanical second curtain indicated by a reference numeral 702 (a curtain speed characteristic 702) is similar to the curtain speed characteristic 703. Furthermore, the curtain speed characteristic varies in accordance with the position of the digital camera 1 (the orientation of the camera held by the user), temperature, moisture, or an aging effect of components of the shutter unit 43.

Figure 11:
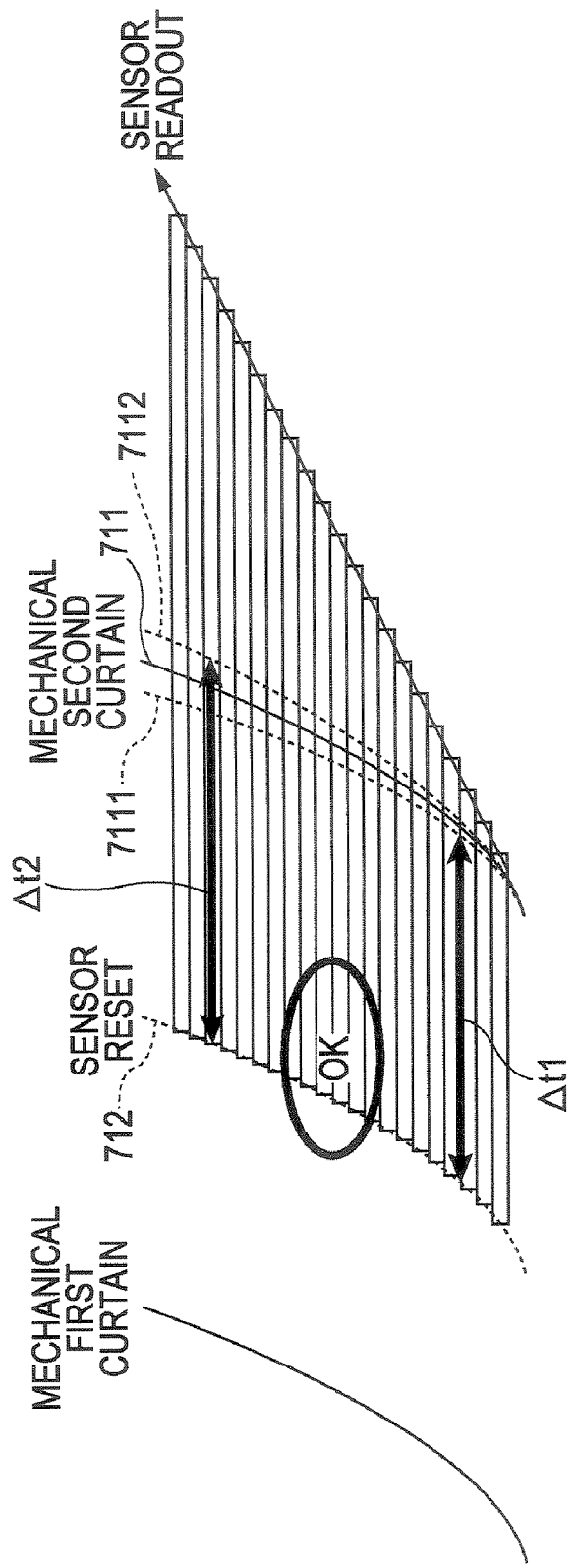
FIG. 11 is a schematic illustration of a shift of a curtain speed characteristic at a low SS when the electronic focal plane shutter is used for a first curtain.

As shown in FIG. 11, when the shutter speed is low (low SS), the operation of the second curtain (mechanical second curtain) indicated by a curtain speed characteristic 711 is started much later than that of the first curtain (sensor reset) indicated by a curtain speed characteristic 711. Accordingly, an exposure time including a period in which the image frame is fully open becomes long. Thus, a difference in curtain speed characteristic between the first curtain and the second curtain (a curtain speed difference) is not critical. That is, for a curtain speed characteristic 712 of the electronic focal plane shutter having a significantly precise operation and an unchanged curtain speed characteristic, even when the curtain speed characteristic 711 of the mechanical focal plane shutter is changed to, for example, a curtain speed characteristic 7111 or a curtain speed characteristic 7112, an exposure time Δt1 generated by the curtain speed characteristic 712 and the curtain speed characteristic 7111 is not significantly different from an exposure time Δt2 generated by the curtain speed characteristic 712 and the curtain speed characteristic 7112 (Δt1≈Δt2). Accordingly, unevenness of exposure does not occur (even if unevenness of exposure occurs, the unevenness of exposure is within the allowable margin of error).

However, when the shutter speed is high (high SS), this unevenness of exposure is a problem. At a high SS, as indicated by a drawing indicated by a reference numeral 720 in FIG. 12, an operation interval (a time difference) between the first curtain (sensor reset) indicated by a curtain speed characteristic 721 and a second curtain (mechanical second curtain) indicated by a curtain speed characteristic 722 is small. During the open operation of the first curtain, the operation of the second curtain is started. Thus, a so-called slit exposure is performed. In the case of the slit exposure, if the curtain speed characteristics of the first curtain and the second curtain are different, that is, for the curtain speed characteristic 721 of the electronic focal plane shutter, if the curtain speed characteristic 722 of the mechanical focal plane shutter is changed to, for example, a curtain speed characteristic 7221 or a curtain speed characteristic 7222, an exposure time Δt3 generated by the curtain speed characteristic 721 and the curtain speed characteristic 7221 is significantly different from an exposure time Δt4 generated by the curtain speed characteristic 721 and the curtain speed characteristic 7222 (Δt3≠Δt4). Accordingly, exposure times for the pixel lines of the image sensor 30 are different from each other (the exposure times for different portions of the light receiving surface 301a are different from each other), and therefore, unevenness of exposure occurs.

Figure 12:
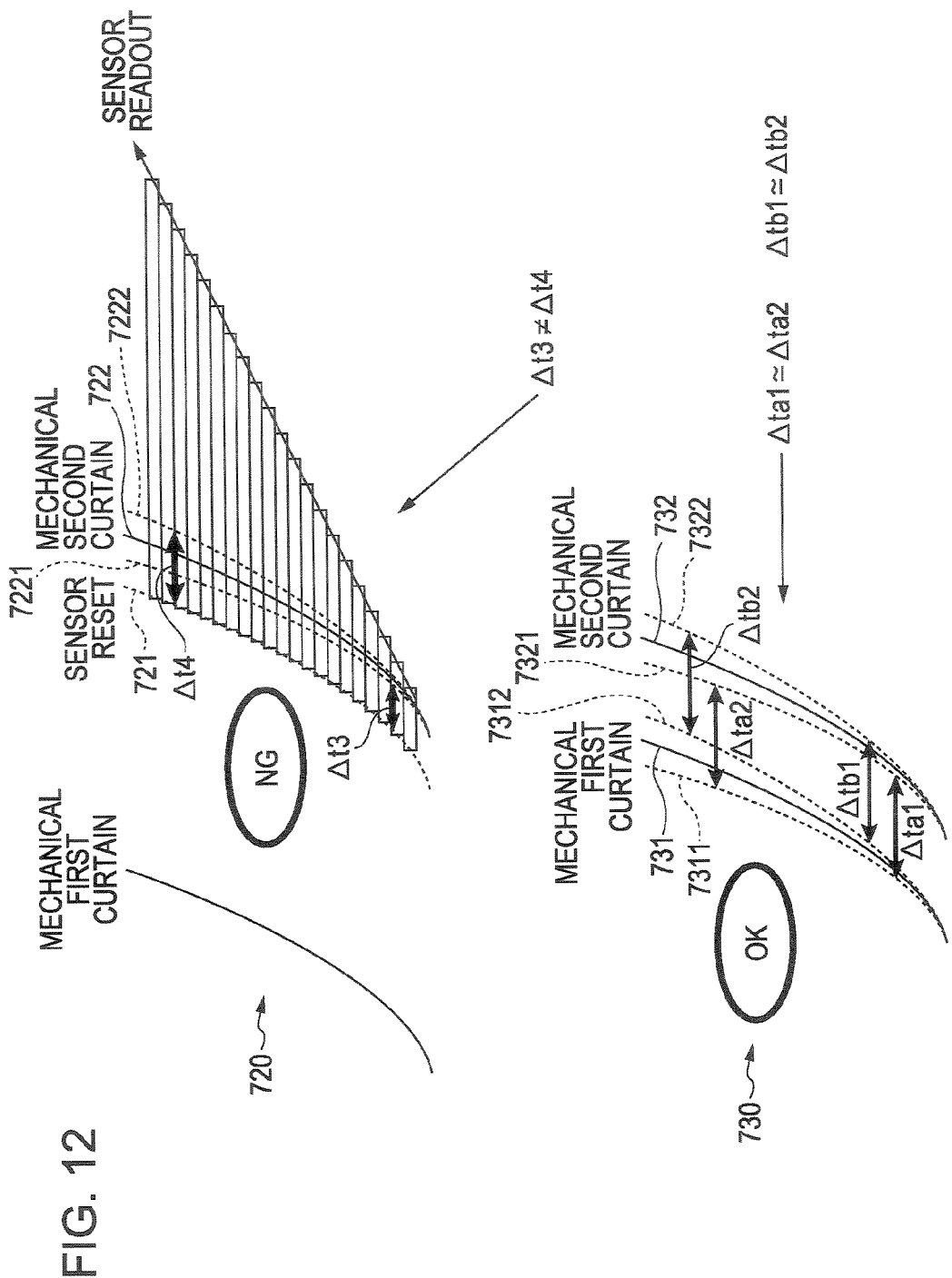
FIG. 12 is a schematic illustration of a shift of a curtain speed characteristic at a high SS when the electronic focal plane shutter is used for a first curtain.

In contrast, as shown in a drawing indicated by a reference numeral 730 in FIG. 12, when the first curtain and the second curtain of the mechanical focal plane shutter are used, unevenness of exposure rarely occurs even when the aging effect occurs. This is because the curtain speed characteristics of the first curtain and the second curtain changes in substantially the same manner. That is, when a curtain speed characteristic 731 of the first curtain (a mechanical curtain) is changed to, for example, a curtain speed characteristic 7311 or a curtain speed characteristic 7312, and a curtain speed characteristic 732 of the second curtain (a mechanical curtain) is changed to, for example, a curtain speed characteristic 7321 or a curtain speed characteristic 7322, directions in which the operations of the first curtain and the second curtain vary are the same. That is, when the curtain speed characteristic 731 is changed toward the curtain speed characteristic 7311 side, the curtain speed characteristic 732 is changed toward the curtain speed characteristic 7321 side, which is the same as the curtain speed characteristic 7311 side. Similarly, the curtain speed characteristic 731 is changed toward the curtain speed characteristic 7312 side, the curtain speed characteristic 732 is changed toward the curtain speed characteristic 7322 side. Accordingly, in the both variations, the exposure times are not significantly different (Δta1≈Δta2, and Δtb1≈Δtb2). Therefore, at a high SS, use of the first shutter and the second shutter of the mechanical focal plane shutter can reduce the occurrence of a problem of unevenness of exposure.

[2] Edge Darkening Problem at High SS

In the structure shown in FIG. 9, if exposure control is performed only by the first curtain group 431 and the second curtain group 432 of the shutter unit 43, that is, only by a mechanical focal plane shutter, a total exposure time Tm is expressed as follows:

$$Tm = (W + ds/A)V \quad (1)$$

where
W=the slit width
ds=an average distance between the light receiving surface 301a and a slit running plane
A=the F no. of a lens (focal length f/effective diameter of a lens D)
V=a running speed of the slit.

In the case where the first curtain group 431 and the second curtain group 432 are used, ds represents a distance between the middle point between the first curtain group 431 and the second curtain group 432 and the light receiving surface 301a, as indicated by arrow x1 in FIG. 9. In contrast, as in the present embodiment, in the case where a first curtain of an electronic focal plane shutter and a second curtain of the second curtain group 432 are used, the position of the first curtain=the position of the light receiving surface 301a. Accordingly, as indicated by arrow x2 in FIG. 9, ds represents about half the distance between the light receiving surface 301a and the second curtain group 432. In this way, according to the present embodiment, ds can be decreased. However, since the optical lowpass filter 304 is disposed, the position of the first curtain (the light receiving surface 301a) is distant from the position of the second curtain (the second curtain group 432 of the shutter unit 43). Therefore, an edge darkening problem arises depending on the F no. and the position of the exit pupil of the lens at a high SS.

Figure 13:
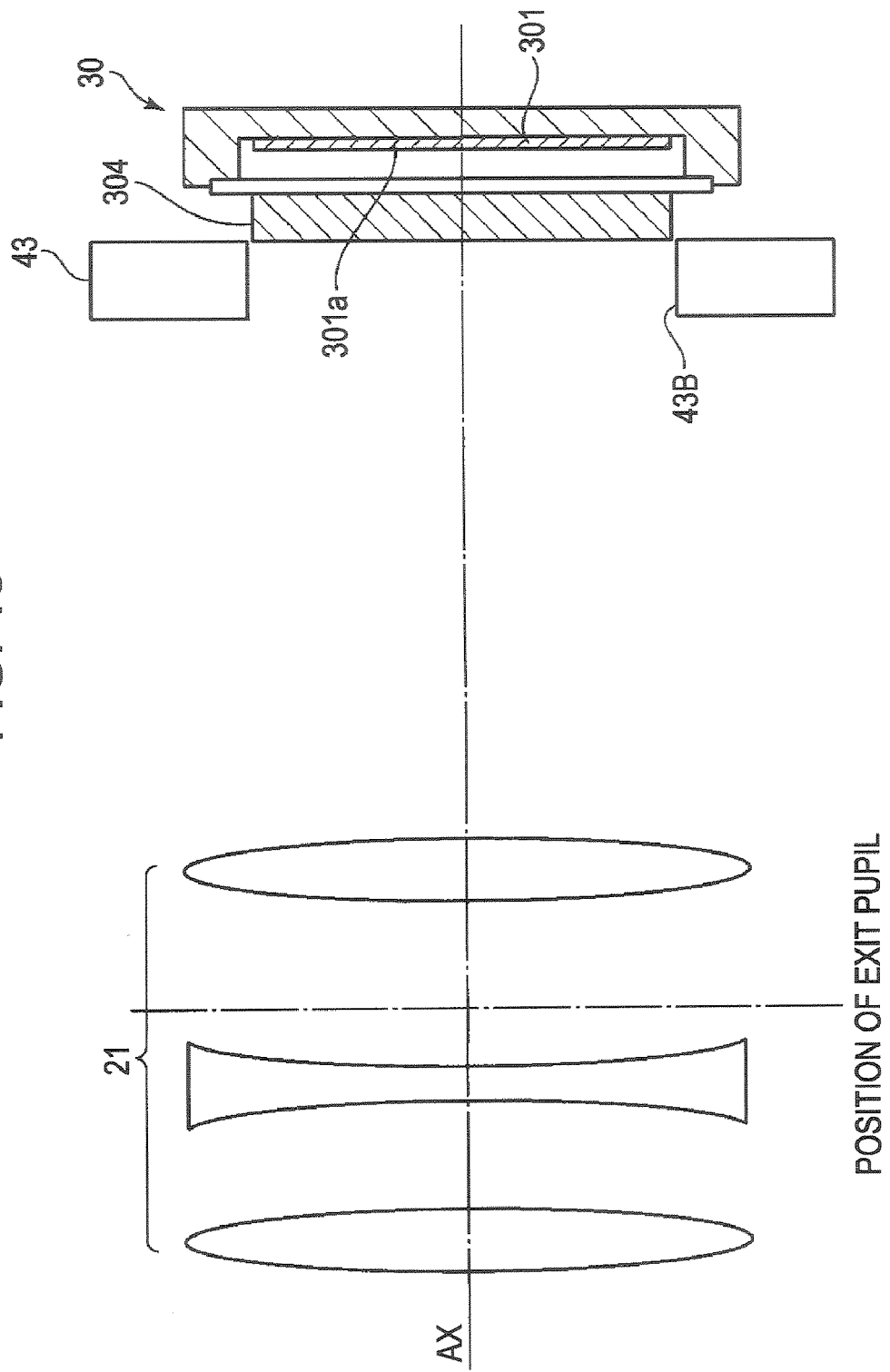
FIG. 13 is a cross-sectional view illustrating a relationship among the exit pupil, the image sensor, and the shutter unit.
Figure 14:
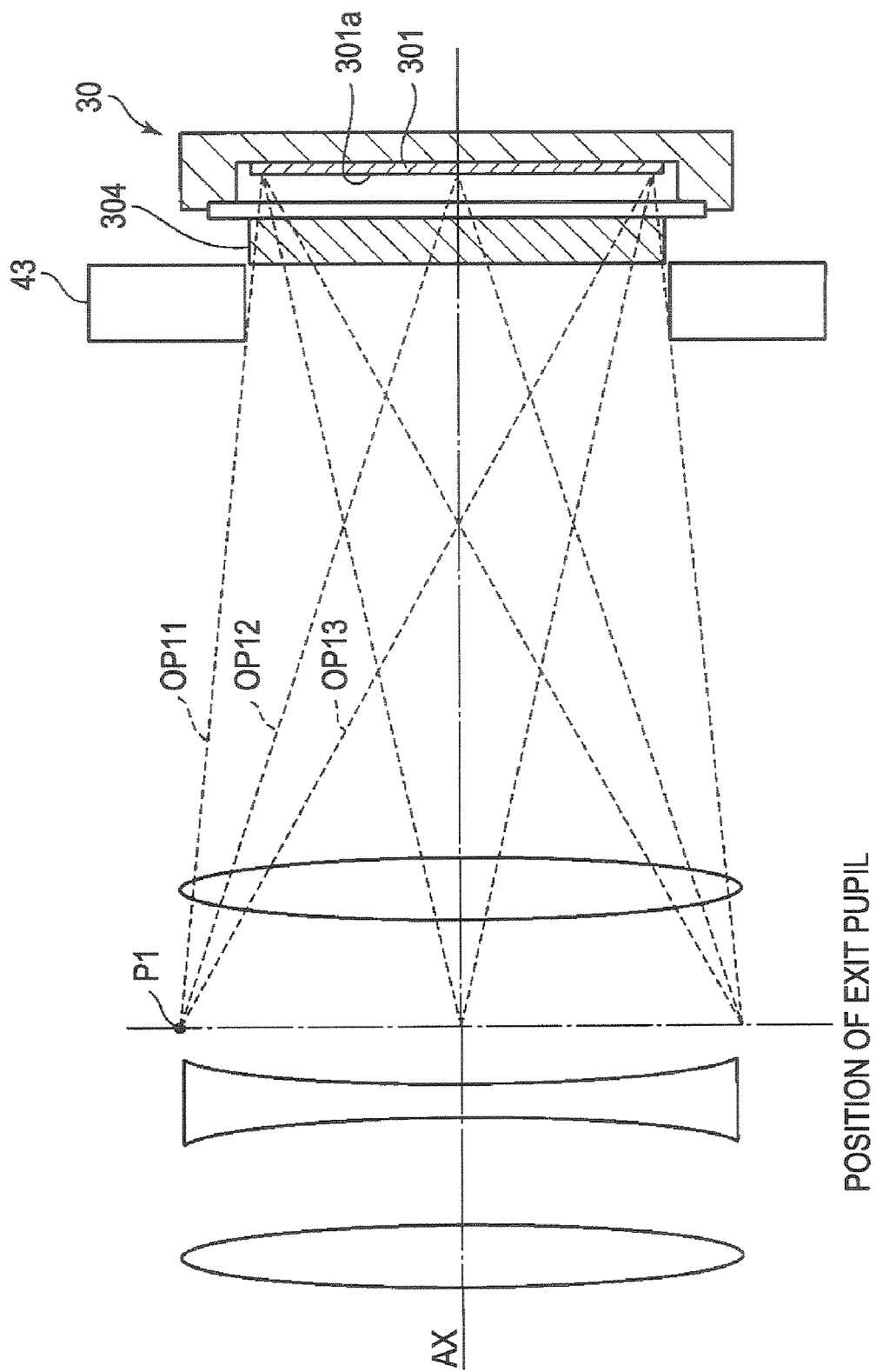
FIG. 14 is a cross-sectional view illustrating a light ray incident on the image sensor.

Assume that the lens groups 21 and the image sensor 30 are disposed on a light axis AX, and the position of the exit pupil is located as shown in FIG. 13. In such a case, as shown in FIG. 14, when the F no. is small (e.g., F2), the diameter of the exit pupil is large. When looking at light rays op11 to op13 emitted from a point P1 located at the uppermost position on the outermost periphery of the exit pupil to the imaging plane, the inclination angle of the light ray op11 traveling towards the upper edge of the light receiving surface 301a with respect to the light axis AX is relatively small. However, the inclination angles of the light ray op12 traveling towards the center of the light receiving surface 301a and the light ray op13 traveling towards the lower edge of the light receiving surface 301a with respect to the light axis AX is large.

Figure 15:
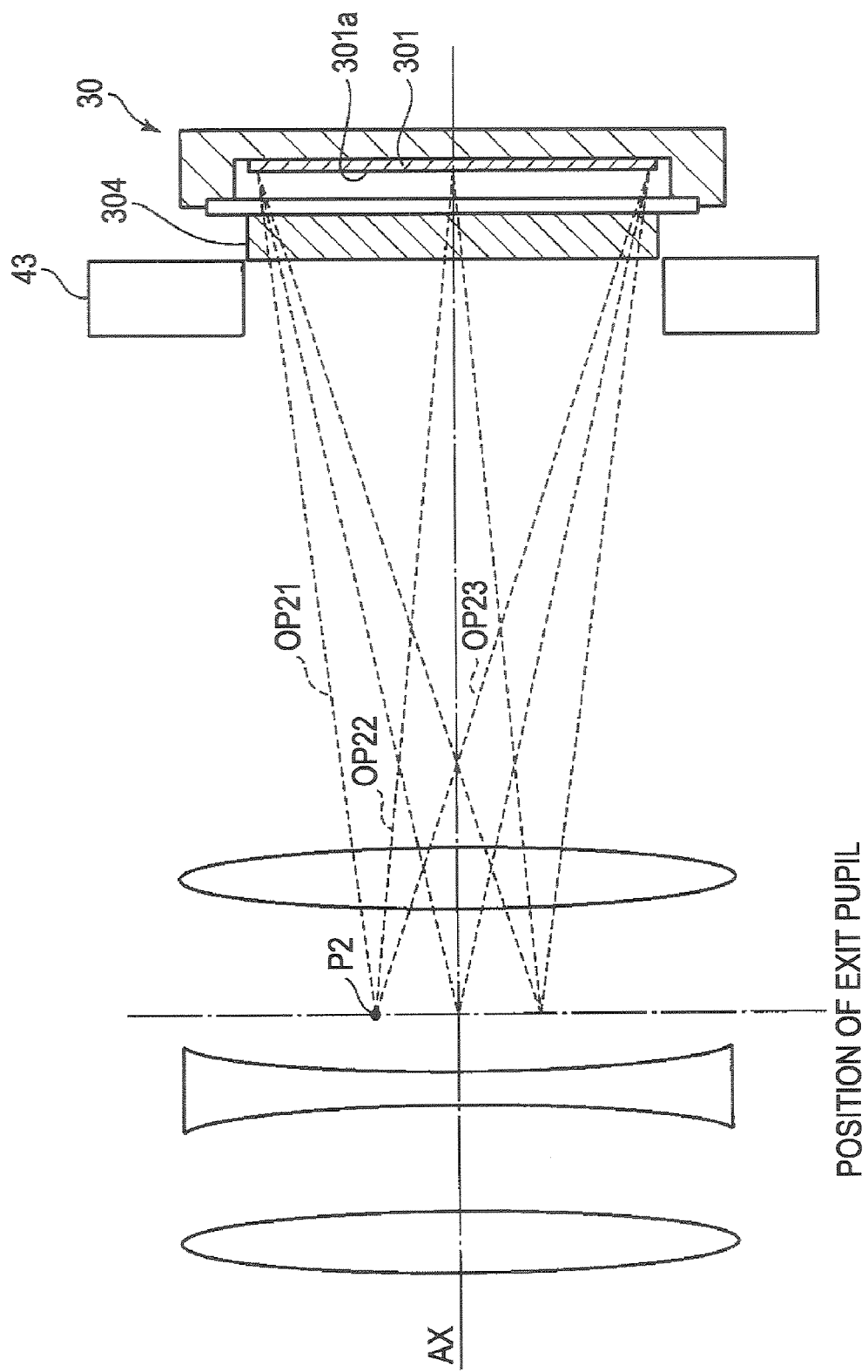
FIG. 15 is a cross-sectional view illustrating a light ray incident on the image sensor.

In contrast, as shown in FIG. 15, when the F no. is large (e.g., F8), the diameter of the exit pupil is small. When looking at light rays op21 to op23 emitted from a point P2 located at the uppermost position on the outermost periphery of the exit pupil to the imaging plane, the inclination angle of any one of the light rays op21 to op23 traveling towards the upper edge to the lower edge of the light receiving surface 301a with respect to the light axis AX is relatively small.

Figure 16:
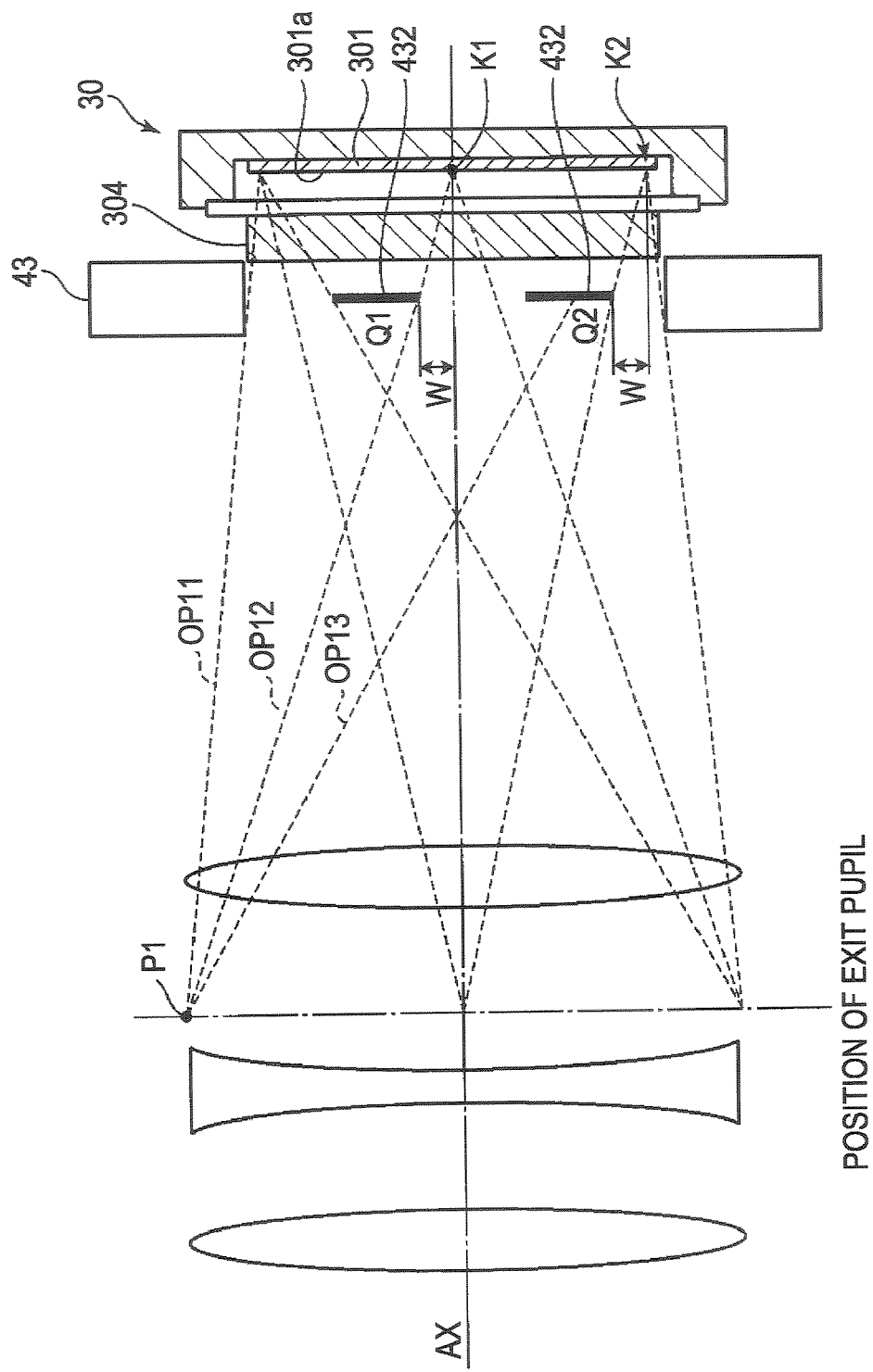
FIG. 16 is a cross-sectional view illustrating a light ray incident on the image sensor.

In addition, when the F no. is small (refer to FIG. 14), an edge darkening problem occurs on the light receiving surface 301a since the first curtain is optically distant from the second curtain, as shown in FIG. 16. In FIG. 16, the width of a slit formed by the second curtain group 432 (the second curtain) and the first curtain of the electronic focal plane shutter in the light receiving surface 301a is indicated by arrow w. When the curtain of the second curtain group 432 is located at a position indicated by a reference symbol Q1 and the exposure slit reaches a middle point K1 of the light receiving surface 301a, the light ray op12 traveling from the point P1 towards the center of the light receiving surface 301a reaches the light receiving surface 301a without being blocked by the curtain. However, when the curtain of the second curtain group 432 is located at a position indicated by a reference symbol Q2 and the exposure slit reaches a point K2 located near the lower edge of the light receiving surface 301a, the light ray op13 traveling from the point P1 towards the lower edge of the light receiving surface 301a is blocked by the curtain. Thus, the light ray op13 does not reach the light receiving surface 301a. Such edge darkening phenomenon causes unevenness of exposure.

Figure 17:
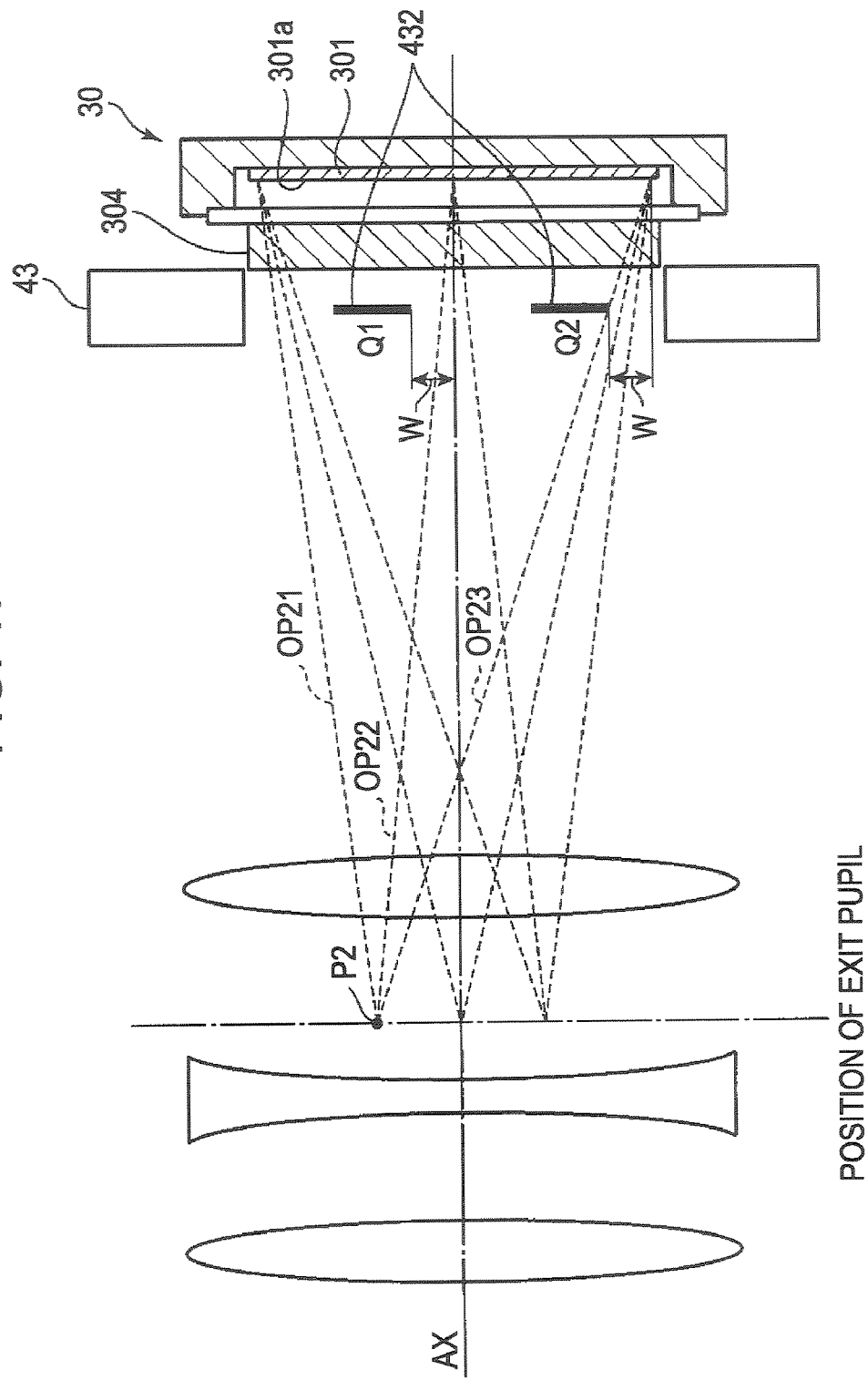
FIG. 17 is a cross-sectional view illustrating a light ray incident on the image sensor.

In contrast, when the F no. is large (FIG. 15), an edge darkening problem rarely occurs, as shown in FIG. 17. That is, even when the curtain of the second curtain group 432 is located at the position indicated by the reference symbol Q2, the light ray op23 traveling from the point P2 towards the lower edge of the light receiving surface 301a is not blocked by the curtain, since the inclination angle with respect to the light axis AX is small. As described above, at a high SS (during slit exposure), unevenness of exposure may occur due to the edge darkening phenomenon depending on the F no. As can be seen, the occurrence of the edge darkening phenomenon depends on not only fixed factors, such as the thickness of the optical lowpass filter 304, but also the position of the exit pupil.

In order to avoid the above-described problems [1] and [2], at a low SS, the digital camera 1 according to the present embodiment employs a first curtain of the electronic focal plane shutter and a second curtain of the mechanical focal plane shutter. That is, the exposure start operation is performed by the electronic focal plane shutter, which is a function of the image sensor 30. The exposure end operation is performed by the mechanical focal plane shutter. At a high SS, the digital camera 1 employs the first curtain and the second curtain of the mechanical focal plane shutter. That is, both exposure start operation and exposure end operation are performed by the mechanical focal plane shutter. To perform such control, the shutter control unit 623 is provided. The shutter control unit 623 performs control so as to select one of the mechanical focal plane shutter and the electronic focal plane shutter for the first curtain in accordance with the high SS or low SS.

Figure 18:
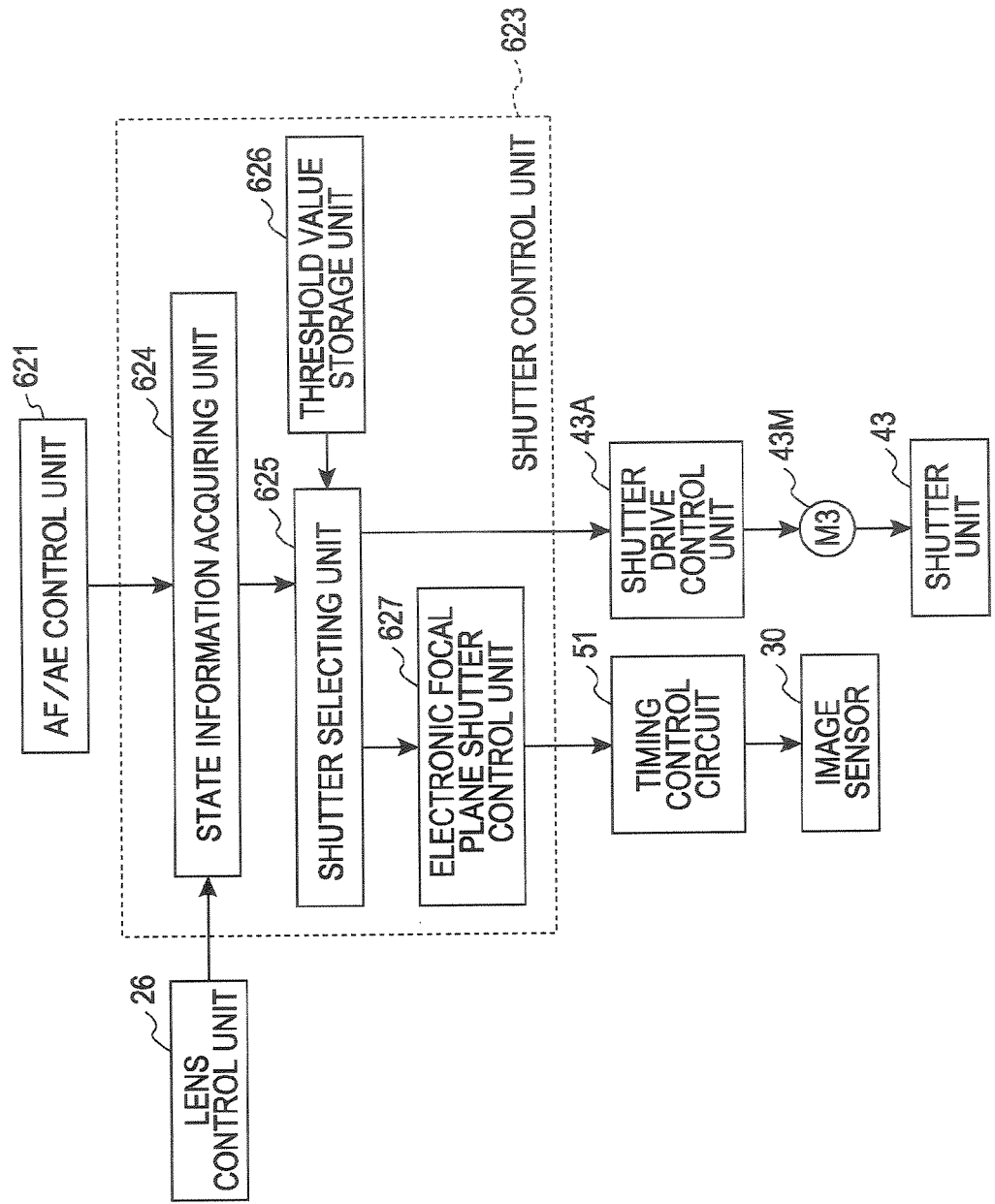
FIG. 18 is a functional block diagram of a shutter control unit.

FIG. 18 is a functional block diagram of the shutter control unit 623. The shutter control unit 623 includes a state information acquiring unit 624, a shutter selecting unit 625, a threshold value storage unit 626, and an electronic focal plane shutter control unit 627.

When the photo-taking lens 2 (interchangeable lens) is replaced, the state information acquiring unit 624 acquires state information, such as the focal length, the position of the exit pupil, an aperture value, and a focusing distance, from the lens control unit 26 (the communication unit 262) of the photo-taking lens 2. When an image is captured, the state information acquiring unit 624 acquires state information, such as a focal length and an aperture value set by the AE/AF control or a photographer. FIG. 19 illustrates an example of the state information data communicated when the photo-taking lens 2 is replaced and an image is captured.

The shutter selecting unit 625 determines which one of the mechanical focal plane shutter and the electronic focal plane shutter is selected for the first curtain on the basis of the state information acquired by the state information acquiring unit 624. More specifically, the shutter selecting unit 625 determines (sets) a shutter speed on the basis of the above-described state information (e.g., a variety of data of the photo-taking lens 2, a focal length, and an aperture value determined by the AF/AE control). Subsequently, the shutter selecting unit 625 compares the determined shutter speed with a predetermined threshold value of a shutter speed so as to determine whether the determined shutter speed is a low SS or a high SS. Thus, the shutter selecting unit 625 selects an appropriate first curtain.

The predetermined threshold value of a shutter speed is determined on the basis of, for example, the focal length of the image capturing optical system. In this case, let f (mm) denote the 135-system equivalent focal length. Then, if the shutter speed is set to a value lower than 1/f (sec), the shutter speed is determined to be a slow SS, and therefore, the electronic focal plane shutter may be selected for the first curtain. However, if the shutter speed is set to a value higher than 1/f (sec), the shutter speed is determined to be a high SS, and therefore, the mechanical focal plane shutter may be selected for the first curtain. In the case where an image sensor having a size equivalent to the APS-C format is used, if the shutter speed is set to a value lower than about 1/1.5f (sec), the shutter speed can be determined to be a slow SS. Furthermore, the predetermined threshold value of a shutter speed may be determined on the basis of the flash synchronization shutter speed. As used herein, the term "flash synchronization shutter speed" (the synchronization speed) refers to a shutter speed that allows a shutter to be fully open during a time period from the start of the emission to the end of the emission of the flash light plus a slight margin time for when an image capturing mode with a flash is set.

In addition, the shutter selecting unit 625 sends selection information as to which one of the mechanical focal plane shutter and the electronic focal plane shutter is used for the first curtain (or determination information as to whether the determined shutter speed is high or low) to the shutter drive control unit 43A and the electronic focal plane shutter control unit 627.

The threshold value storage unit 626 stores information about the threshold value (the above-described shutter speed threshold value) required for determining whether the set shutter speed is a low SS or a high SS in the shutter selecting unit 625.

Figure 27:
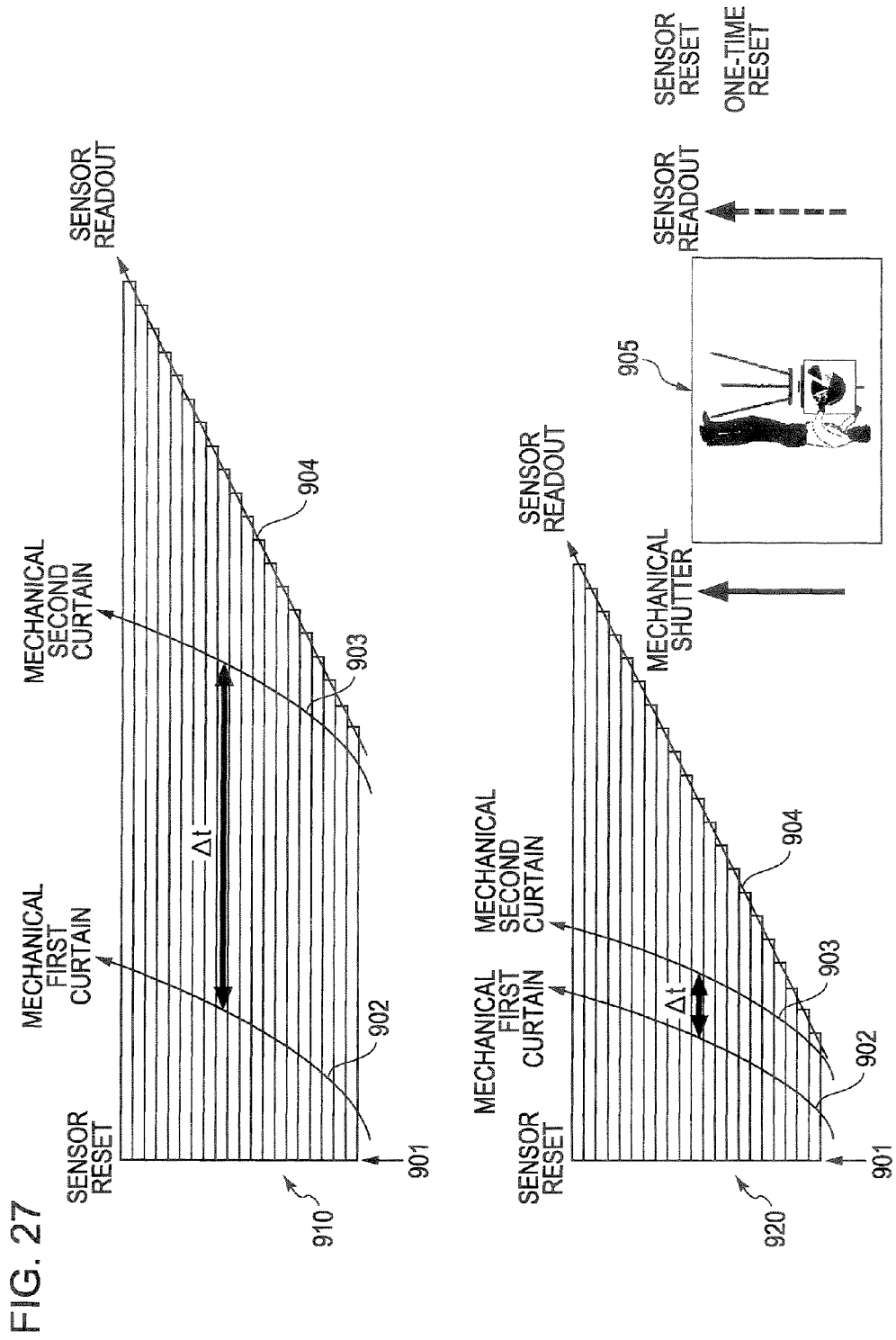
FIG. 27 is a schematic illustration of the image capturing operation performed by an existing digital camera.
Figure 28:
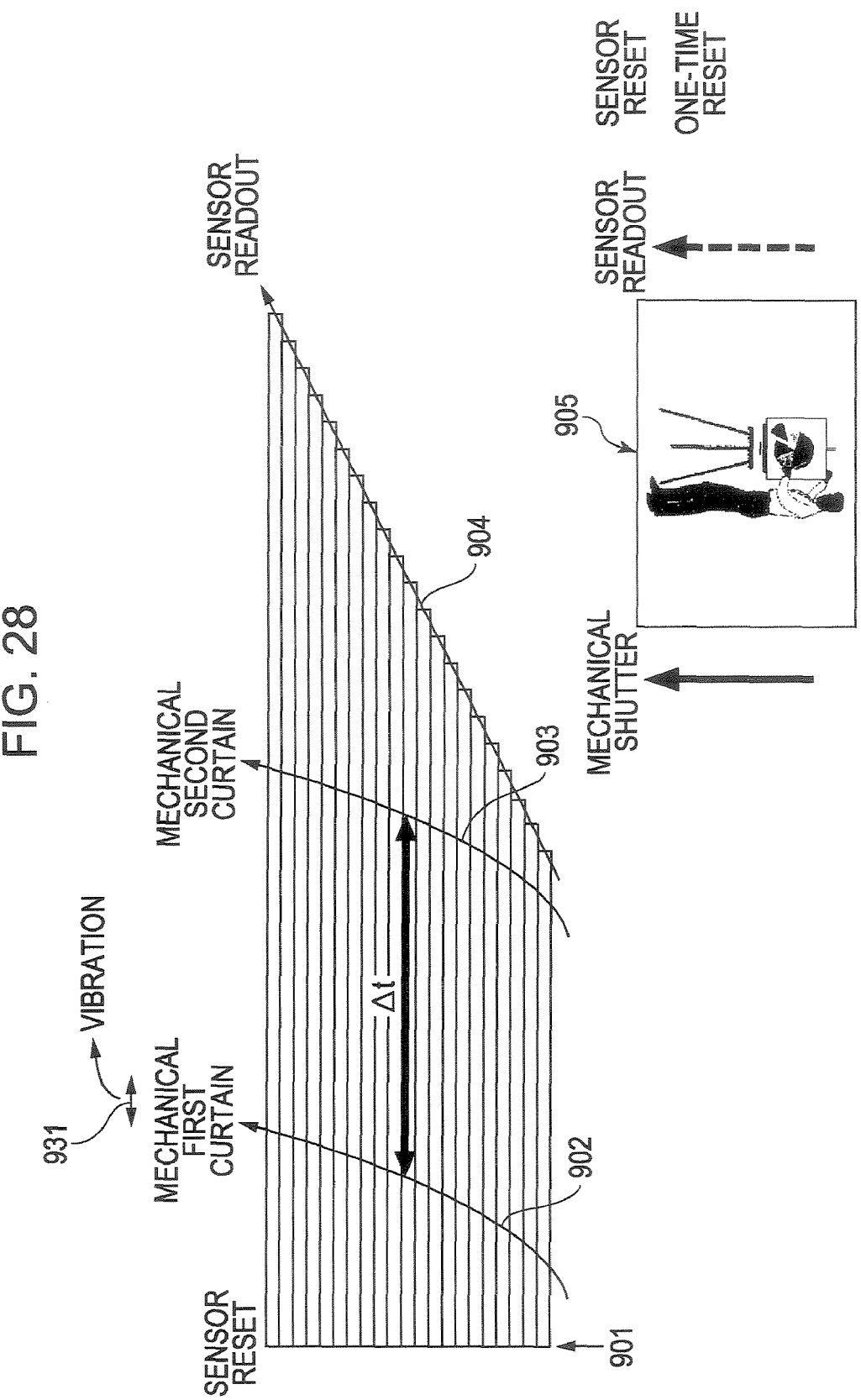
FIG. 28 is a schematic illustration of vibration of a first curtain of an existing digital camera.

Upon receipt of the above-described selection information (determination information) from the shutter selecting unit 625, the electronic focal plane shutter control unit 627 performs control so that a first curtain, that is, the exposure start operation is performed by the electronic focal plane shutter. More specifically, the electronic focal plane shutter control unit 627 sets a pixel-line to pixel-line based reset timing for the vertical scanning circuit 37 (refer to FIG. 7) of the image sensor 30, which is controlled by the timing control circuit 51. At the reset timing, the electronic focal plane shutter control unit 627 sequentially supplies the reset signal φVr to the pixel lines 32a to 32c so that the image sensor 30 operates as a first curtain of the electronic focal plane shutter. As shown in FIG. 10, the reset timing of the electronic focal plane shutter is determined so that the shutter speed characteristic (the shutter speed characteristic 701) is similar to the shutter speed characteristic of the mechanical focal plane shutter (the shutter speed characteristic 702 or 701). That is, the reset timing used in this example is not a one-time reset shown in FIG. 27. As noted above, a so-called focal reset is performed in which the curtain speed is gradually increased and reaches the maximum speed at the end of the operation.

According to the digital camera 1 having such a configuration, since both first curtain and second curtain are provided by the mechanical focal plane shutter at a high shutter speed, a problem of unevenness of exposure caused by the difference in a curtain speed between the first curtain and the second curtain or a positional shift between the curtain surfaces (the occurrence of an edge darkening problem) can be prevented. In addition, since the electronic focal plane shutter is used for the first curtain at a low shutter speed, power consumption (the operating power) can be reduced as compared with use of the first curtain of the mechanical focal plane shutter. In addition, since the exposure time is long, the occurrence of unevenness of exposure due to the difference in a curtain speed between the first curtain and the second curtain and a shift between the positions of the curtains is significantly reduced. Therefore, unevenness of exposure does not practically occur. In particular, in the case where a live view is displayed, if a first curtain of the mechanical focal plane shutter is operated, the first curtain is temporarily open at a start time of the live view, is closed during capturing an image, and then is open again. Thus, the power consumption is significantly reduced. In addition, by using the image sensor 30 of a MOS type, the power consumption can be reduced as compared with, for example, the case where an image sensor of a CCD type is used.

Furthermore, as described above, the digital camera 1 includes a vibration detection sensor 171 for detecting an amount of vibration. In particular, at a slow SS, vibration has a big impact on the digital camera 1. The running vibration of the first curtain of the mechanical focal plane shutter causes an error of the amount of vibration detected by the vibration detection sensor 171. Accordingly, by using the first curtain of the electronic focal plane shutter, erroneous detection of the vibration detection sensor 171 can be prevented.

Description of Operation of Digital Camera

Figure 20:
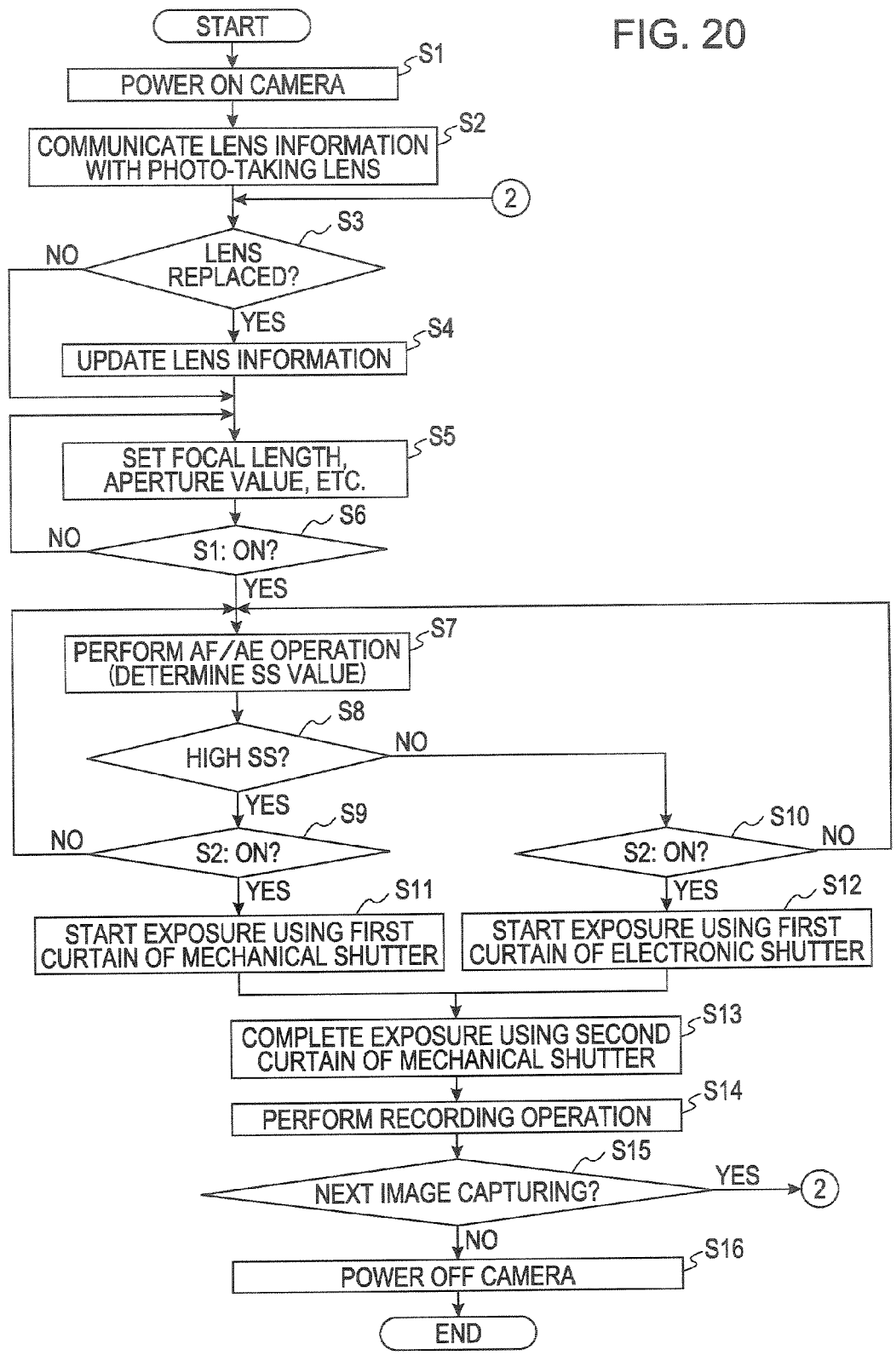
FIG. 20 is a flow chart of the image capturing operation performed by the digital camera.

A series of the image capturing operations performed by the digital camera 1 according to the present embodiment is described next with reference to the drawings described above. FIG. 20 is a flow chart of the image capturing operation performed by the digital camera 1. When the main switch 105 (refer to FIG. 2) is turned on, the digital camera 1 is powered on (step S1). The main control unit 62 (the shutter control unit 623) communicates with the lens control unit 26 of the photo-taking lens 2 so as to acquire lens information about the mounted photo-taking lens 2 (step S2).

Subsequently, the main control unit 62 determines whether the photo-taking lens 2 has been interchanged (step S3). If the photo-taking lens 2 has been interchanged ("YES" at step S3), the main control unit 62 communicates with the photo-taking lens 2 so as to acquire the lens information as in step S2 and updates the old information with the acquired lens information (step S4). However, if the photo-taking lens 2 has not been interchanged ("NO" at step S3), the process in step S4 is skipped. Thereafter, the main control unit 62 sets a Local length and an aperture value on the basis of the lens information acquired in step S2 or S4 (step S5). This setting is not a final one, but is considered as a default setting for an image capturing operation. In a program image capturing mode, the setting operation is not performed.

Thereafter, the main control unit 62 determines whether the shutter button 13 is pressed halfway down (S1: ON) (step S6). If the shutter button 13 is not pressed halfway down, the main control unit 62 waits until the shutter button 13 is pressed halfway down ("NO" in step S6). If the shutter button 13 is pressed halfway down ("YES" in step S6), the AF/AE control unit 621 of the main control unit 62 performs an AE operation (determination of a shutter speed and an aperture value) using the luminance of the subject and an AF operation (determination of the point of focus) using the phase difference detection method (step S7). At that time, the vibration correction control unit 622 performs image vibration correction control.

Subsequently, the shutter selecting unit 625 compares the shutter speed determined in step S7 with a predetermined shutter speed threshold value stored in the threshold value storage unit 626 so as to determine whether the shutter speed determined in step S7 is a high SS or a low SS. In this way, the shutter selecting unit 625 determines which one of a first curtain of the mechanical focal plane shutter (the first curtain group 431) and a first curtain of the electronic focal plane shutter is selected. If it is determined that the shutter speed is a high SS, that is, if the mechanical focal plane shutter is selected for a first curtain ("YES" in step S8), the process proceeds to step S9. However, if it is determined that the shutter speed is not a high SS, that is, if the electronic focal plane shutter is selected for a first curtain ("NO" in step S8), the process proceeds to step S10.

In step S9, the main control unit 62 determines whether the shutter button 13 is pressed fully down (S2: ON). If the shutter button 13 is not pressed fully down ("NO" in step S9), the process returns to step S7. However, if the shutter button 13 is pressed fully down ("YES" in step S9), the main control unit 62 starts exposure using the first curtain of the mechanical focal plane shutter (mechanical shutter) (step S11).

In step S10, the main control unit 62 determines whether the shutter button 13 is pressed fully down (S2: ON). If the shutter button 13 is not pressed fully down ("NO" in step S10), the process returns to step S7. However, if the shutter button 13 is pressed fully down ("YES" in step S10), the main control unit 62 starts exposure using the first curtain of the electronic focal plane shutter (electronic shutter) (step S12).

Thereafter, the mechanical focal plane shutter is operated for a second curtain (the second curtain group 432) to complete the exposure to the image sensor 30 (step S13). Subsequently, pixel signals are sequentially read out in response to timing pulses supplied from the timing control circuit 51. The readout pixel signals are output to the AFE 5 and are converted to digital signals. The image processing unit 61 performs predetermined image processing on the digital signals and stores the digital signals on the memory card 67. In this way, the series of image recording operations is performed (step S14). Subsequently, the main control unit 62 determines whether it has received the next image capturing instruction (step S15). If the next image capturing instruction is performed ("YES" in step S15), the processes in steps S3 to S14 are repeated. However, if the next image capturing instruction is not performed ("NO" in step S15), the power is automatically turned off after a predetermined time has elapsed (step S16). Thus, the process is completed.

Although the present invention has been shown and described with reference to the foregoing embodiments, alternative embodiments may be made without departing from the spirit and scope of the invention. For example, the following modification of the foregoing embodiments can be provided.

Figure 21:
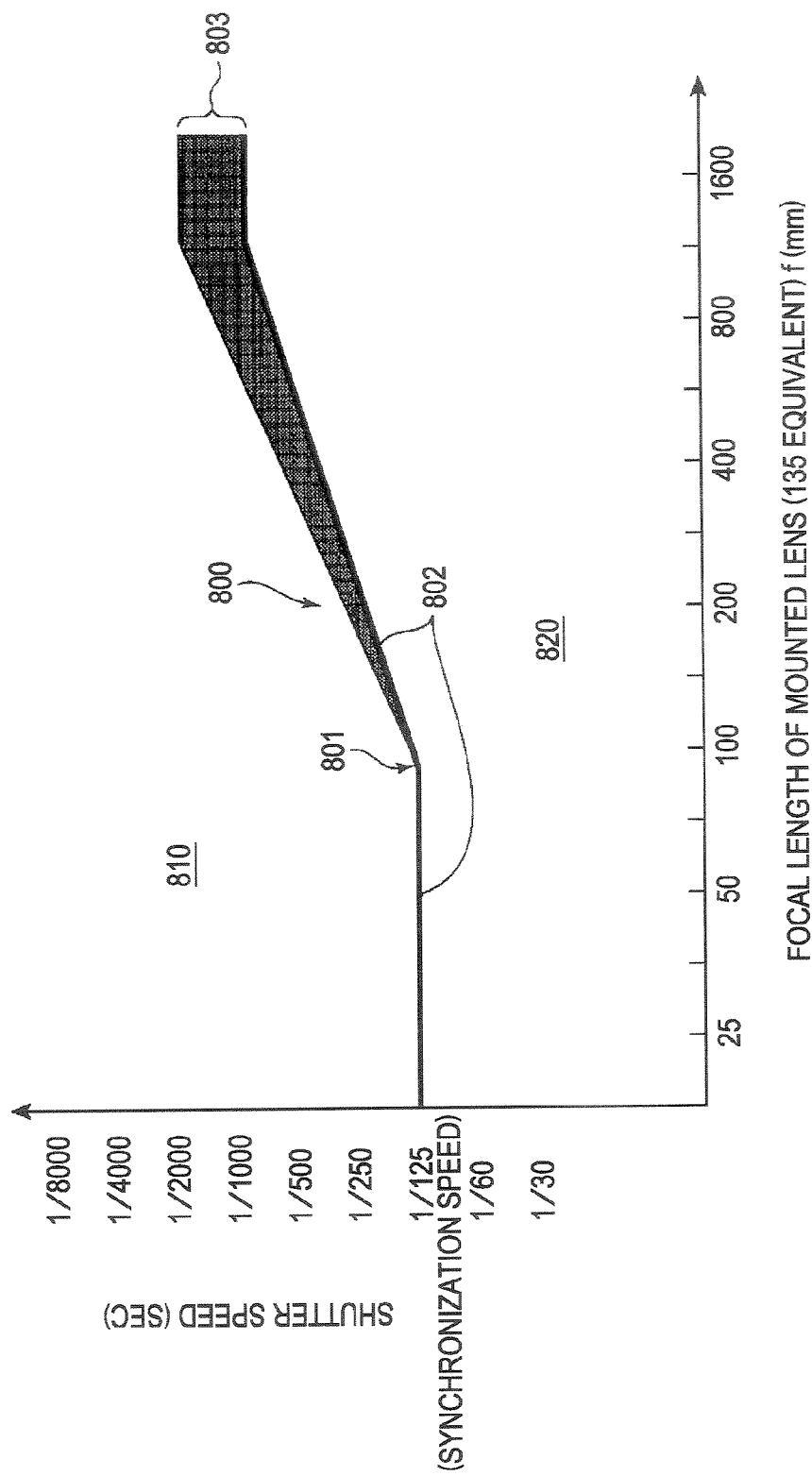
FIG. 21 is a graph illustrating a modification of the embodiment of the digital camera.

(1) In the foregoing embodiments, the shutter selecting unit 625 determines whether the shutter speed is a high SS or a low SS so as to select one of the mechanical focal plane shutter and the electronic focal plane shutter for the first curtain. However, for example, as shown in FIG. 21, a switching point (a switch condition or a boundary condition) between the use of the mechanical focal plane shutter and the use of the electronic focal plane shutter may be provided, and a determination operation may be made on the basis of the switching point. That is, in FIG. 21, the abscissa represents a focal length f (mm) and the ordinate represents a shutter speed (sec). As indicated by a reference numeral 800, the characteristic graph regarding the switching point (hereinafter referred to as a "switching characteristic 800") represents the boundary. In an area 810 above the boundary determined by the values of the focal length and the shutter speed, the mechanical focal plane shutter is used for the first curtain. In contrast, in an area 820 below the boundary, the electronic focal plane shutter is used for the first curtain. That is, the electronic focal plane shutter may be used for the first curtain, and the mechanical focal plane shutter may be used for the second curtain.

In the switching characteristic 800, when the focal length of the mounted photo-taking lens is less than or equal to a predetermined value (e.g., the value at a point 801), the shutter speed is constant (e.g., $\frac{1}{125}$ sec, which is the flash synchronization shutter speed (a synchronization speed Tc)). As the focal length increases beyond the predetermined value, a shutter speed serving as the switching level increases. More specifically, as indicated by a bold line 802, the switching characteristic 800 may be a one obtained by considering only the focal length (a switching characteristic 802). Alternatively, as indicated by an area (a width) 803, the switching characteristic 800 may be a one obtained by considering the aperture value and the position of the exit pupil in addition to the focal length. Here, such an area is provided on the right of the point 801 in the switching characteristic 802. This switching characteristic 800 is employed in order to use the electronic focal plane shutter in a further high-speed shutter area in the case where an edge darkening problem caused by a difference between the positions of the curtains of the mechanical focal plane shutter and the electronic focal plane shutter is not critical. That is, this switching characteristic 800 is employed in order to use the electronic focal plane shutter as much as possible.

Figure 22:
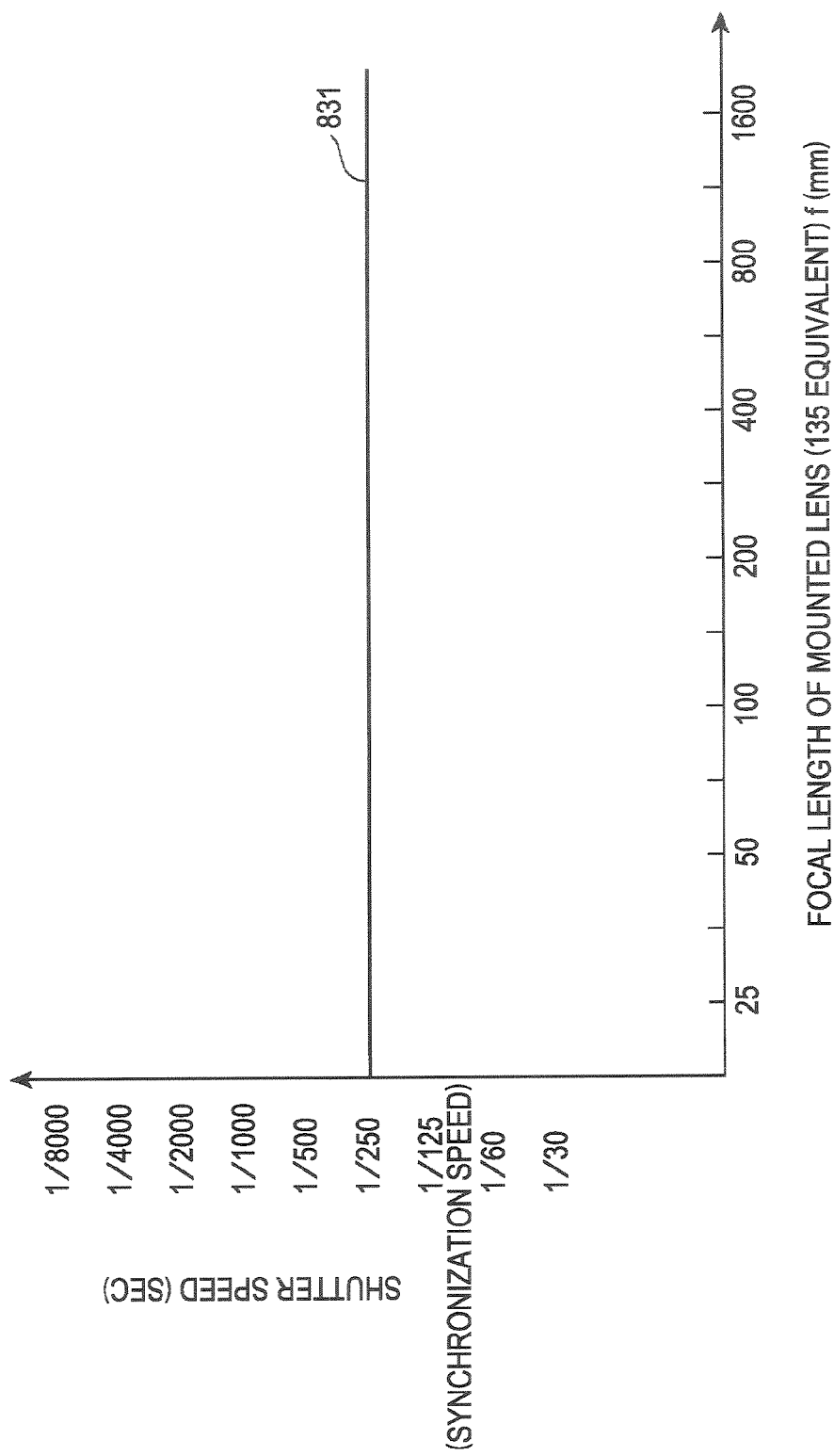
FIG. 22 is a graph illustrating a modification of the embodiment of the digital camera.

As indicated by the switching characteristic 800 (802 or 803), since the switching point is changed in accordance with the focal length, the aperture value, or the information about the position of the exit pupil of the photo-taking lens (either interchangeable or non-interchangeable), flexible shutter control can be provided. For example, the upper limit of the shutter speed that determines the use of the first curtain of the electronic focal plane shutter can be changed to any value (i.e., the first curtain of the electronic focal plane shutter can be used at a higher shutter speed). However, the switching point is not limited to that shown in the switching characteristic 800. For example, the switching characteristic may be a switching characteristic 831 shown in FIG. 22, in which the value of a switching point is fixed to a half (e.g., $\frac{1}{250}$ (sec)) the synchronization speed (e.g., $\frac{1}{125}$ (sec)) regardless of the focal length (i.e., regardless of the type of photo-taking lens). That is, this switching characteristic 831 has a straight-line characteristic.

Figure 23:
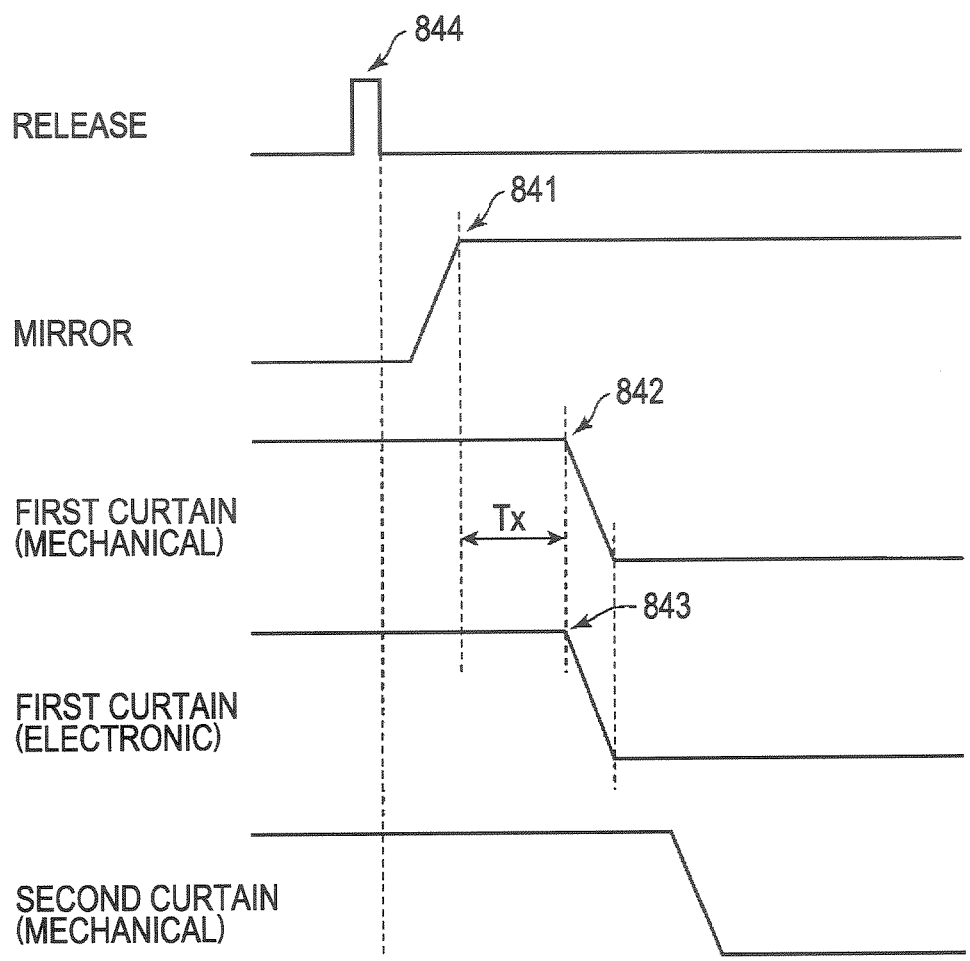
FIG. 23 is a time chart illustrating a modification of the embodiment of the digital camera.

(2) In the foregoing embodiments, upon receipt of an image capturing start instruction through the operation of the shutter button 13, the shutter control unit 623 opens a light path determined by the quick return mirror 441 (and the sub-mirror 442) (a movable mirror) for the image sensor 30. Thereafter, one of the mechanical focal plane shutter and the electronic focal plane shutter starts the exposure operation. In either case where the electronic focal plane shutter or the mechanical focal plane shutter is used for the first curtain, it is desirable that the exposure operation is started after a predetermined time has elapsed since the operation of the quick return mirror 441 was completed. That is, as shown by a timing diagram of FIG. 23, let a time period Tx denote a period from a time 841 when a pop-up operation of the quick return mirror 441 (mirror lockup operation) is completed to a time 842 when the mechanical focal plane shutter starts an exposure operation. Also, let a time period Tx denote a period from the time 841 when a pop-up operation of the quick return mirror 441 (mirror lockup operation) is completed to a time 843 when the electronic focal plane shutter starts an exposure operation. It is desirable that control is performed so that these two time periods Tx are equal. In this way, in either case where the electronic focal plane shutter or the mechanical focal plane shutter is selected, the time period from a time when the quick return mirror 441 completes the operation thereof to a time when an exposure operation is started is constant (without any variation). For example, a user can easily measure a time period from a time 844 when the user presses the shutter button 13 to a time an exposure operation is started. Thus, in either case where the electronic focal plane shutter or the mechanical focal plane shutter is used, an image can be captured (the exposure operation can be started) at the same release timing. As a result, the ease of the operation of the digital camera 1 can be increased.

Figure 24:
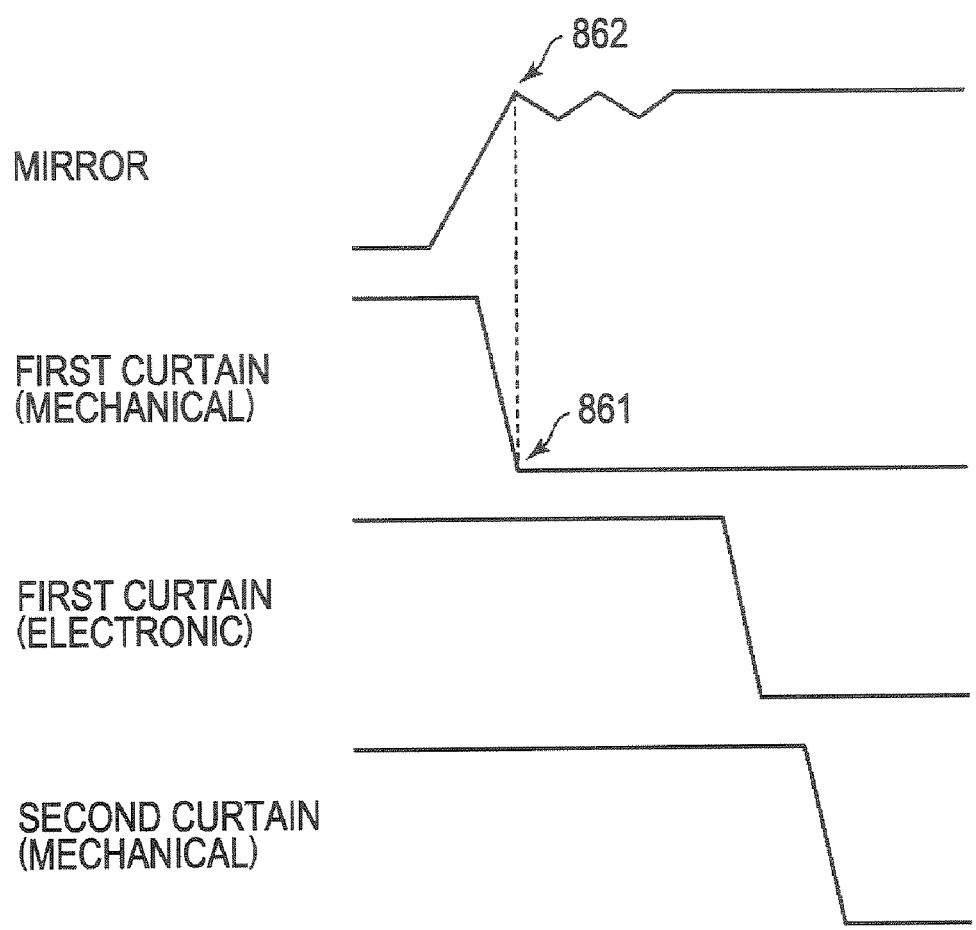
FIG. 24 is a time chart illustrating a modification of the embodiment of the digital camera.

(3) The timing at which the first curtain (the first curtain group 431) of the mechanical focal plane shutter is opened may be synchronized with the time to the timing at which the quick return mirror 441 is opened, and the moving directions thereof may be reversed. More specifically, as shown in FIG. 24, a timing 861 at which the separate curtains 4311 to 4314 of the first curtain group 431 are moved from a closed state to an open state and collide with the shutter plates 430A and 430B of the shutter unit 43 may be synchronized with a timing 862 at which a lockup operation of the quick return mirror 441 is completed, and the moving direction of the separate curtains 4311 to 4314 (the direction of the opening operation) is reversed from the moving direction of the quick return mirror 441 (the direction of the opening operation). For example, the opening operation of the first curtain group 431 (and the quick return mirror 441) may be controlled so that the quick return mirror 441 moves upwards and the first curtain group 431 moves downwards in the camera.

Figure 25:
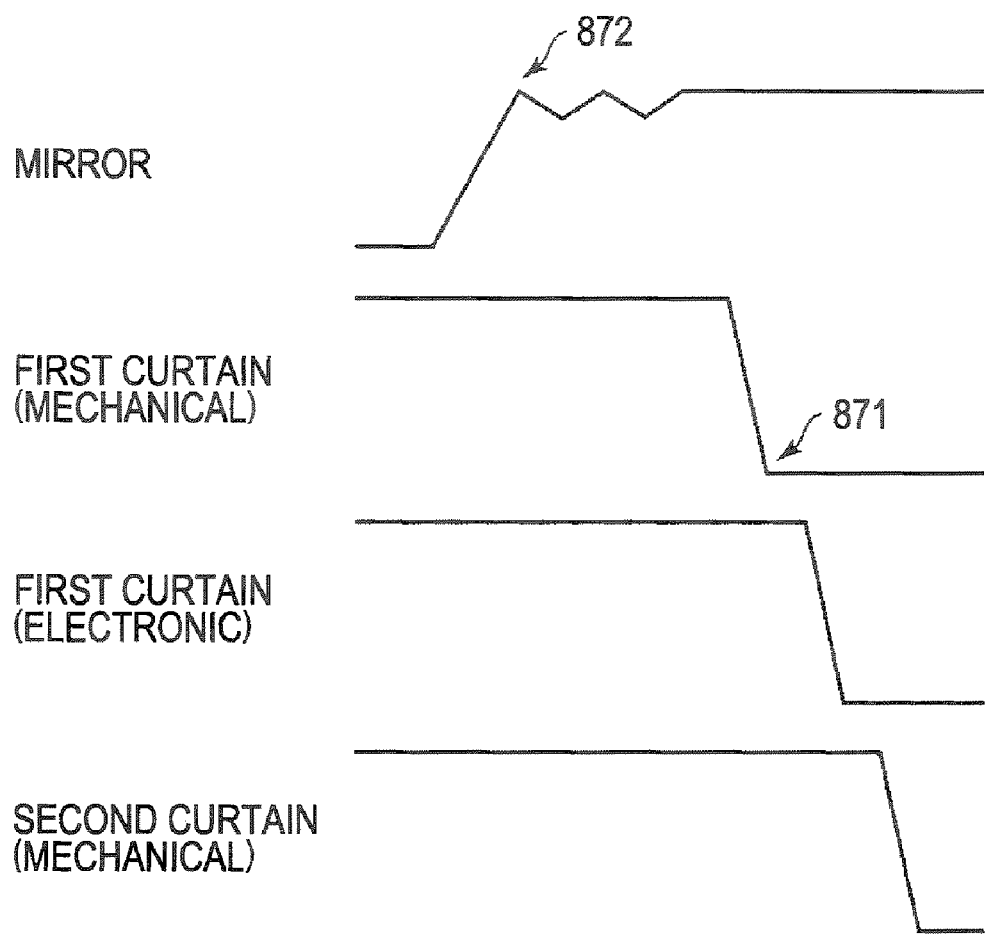
FIG. 25 is a time chart illustrating a modification of the embodiment of the digital camera.

Thus, a shock caused by the opening operation of the first curtain group 431 and a shock caused by the opening operation of the quick return mirror 441, that is, a first curtain shock and a mirror shock can be canceled each other out. Accordingly, a negative effect of impact vibration on a detecting operation of an amount of vibration (a vibration correction operation) or an exposure operation can be further reduced. In addition, the impact vibration is rapidly dumped (stopped). That is, since dumping of the impact vibration can be forcibly performed, a time required for waiting until the vibration has stopped can be reduced, thus providing an efficient image capturing operation. By contrast, as shown in FIG. 25, if a time 871 when the opening operation of the first curtain of the mechanical focal plane shutter is completed is different from a time 872 when the opening operation of the movable mirror is completed, a first curtain shock and a mirror shock occur without being canceled each other out. Accordingly, the digital camera 1 needs to wait until the vibration has stopped, and therefore, the image capturing time increases.

(4) In the foregoing embodiments, as shown in FIG. 10, the first curtain group 431 of the shutter unit 43 is open before the exposure time starts (a mechanical first curtain). After the first curtain shock is dumped and disappears, an exposure operation of the electronic focal plane shutter starts (sensor reset). In this case, it is desirable that the exposure operation of the electronic focal plane shutter starts after a sufficient period of time including a period of time from a time when the first curtain of the mechanical focal plane shutter is open to a time when the impact vibration caused by the first curtain stops has elapsed. Thus, overlap of the first curtain shock with the exposure operation can be reliably avoided. That is, a negative effect of the running vibration of the first curtain on the vibration detecting operation (the vibration correction operation) and the exposure operation can be eliminated. Accordingly, a precise vibration correction operation and a precise image capturing operation can be performed. As a result, an excellent image can be captured.

(5) In FIG. 11, the method is employed in which, as indicated by the curtain speed characteristic 712, the reset operation serving as the first curtain of the electronic focal plane shutter is performed by changing the reset width (by changing a reset timing for each of the pixel lines). However, in place of such a method, the reset operation may be performed without changing the reset width, that is, using a sensor reset changing linearly (a linear curtain speed characteristic). Even in such a method, like the curtain speed characteristic 712, the difference between the linear curtain speed characteristic of the electronic focal plane shutter and the curtain speed characteristic 711 of the mechanical focal plane shutter is not critical at a low SS. That is, the exposure times for the pixel lines are almost the same, and therefore, unevenness of exposure does not occur (even if unevenness of exposure occurs, the unevenness of exposure is within the allowable margin of error).

(6) In the foregoing embodiments, at a low SS, the electronic focal plane shutter is used for the first curtain, and the mechanical focal plane shutter is used for the second curtain. That is, an exposure start operation is performed by the electronic focal plane shutter function of the image sensor 30, and an exposure end operation is performed by the mechanical focal plane shutter. In this configuration, control of the electronic focal plane shutter, that is, parameters (control values) for controlling the exposure start operation of the image sensor 30 may be changed by using at least one of a shutter speed, a focal length, an aperture value, and information about the position of the exit pupil.

Figure 26:
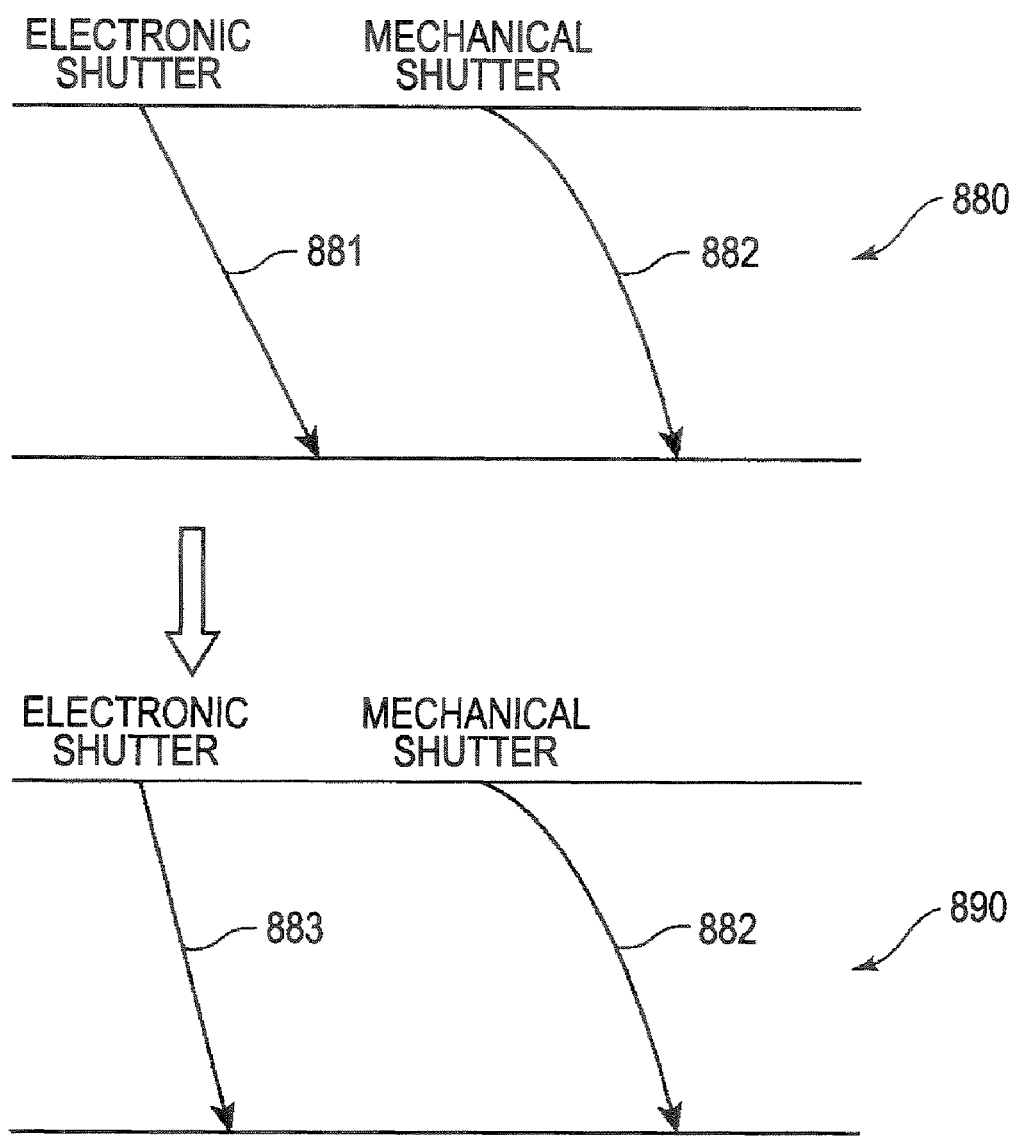
FIG. 26 is a time chart illustrating a modification of the embodiment of the digital camera.

In this case, the shutter control unit 623 and, more specifically, the timing control circuit 51 of the electronic focal plane shutter control unit 627 changes a reset timing of the image sensor 30 (the above-described parameter, for example, corresponds to this reset timing) on the basis of at least one of the shutter speed, the focal length, the aperture value, and information about the position of the exit pupil acquired by the state information acquiring unit 624. In this way, the shutter operation of the electronic focal plane shutter, for example, the shutter speed is changed (control for changing the curtain speed is performed). This configuration can change the curtain speed characteristic of the electronic focal plane shutter (i.e., the shutter speed) so that, for example, a curtain speed characteristic 881 of the electronic focal plane shutter shown in an upper section 880 of FIG. 26 is changed to a curtain speed characteristic 883 shown in a lower section 890 of FIG. 26. Here, the slope of the graph of the curtain speed characteristic 883 is larger than that of the curtain speed characteristic 881, and therefore, the shutter speed of the curtain speed characteristic 883 is higher. Note that a curtain speed characteristic 882 represents the curtain speed characteristic of the mechanical focal plane shutter serving as the second curtain. In addition, although the curtain speed characteristics 881 and 883 are linear in order to clarify the difference between the slopes, the focal reset as shown in the curtain speed characteristic 712 (refer to FIG. 11) can be employed.

As described earlier in FIG. 16, a problem of unevenness of exposure arises due to the edge darkening phenomenon. Even at a low SS, this problem arises as the difference between the positions of the mechanical focal plane shutter and the exposure surface (the electronic focal plane shutter or the image sensor 30) increases. However, in the above-described configuration, by changing the shutter speed of the electronic focal plane shutter (by adjusting the shutter speed to any appropriate value and, in this example, by increasing the shutter speed), the problem of unevenness of exposure that arises at a low SS can be prevented or reduced. It is desirable that as the focal length is decreased and the F no. is decreased or as the position of the exit pupil is closer to the exposure surface, the shutter speed of the electronic focal plane shutter is increased (i.e., the slope of the curtain speed characteristic 883 is increased).

(7) While the foregoing embodiments have been described with reference to the digital camera 1 as an example of an image pickup apparatus according to the present invention, the present invention is applicable to, for example, digital video cameras including a MOS image sensor and sensing apparatuses including an image pickup unit.

The invention claimed is:

1. An image pickup apparatus, comprising:
   an image sensor including a plurality of pixels arranged in a matrix, the image sensor having an electronic focal plane shutter function for providing a predetermined reset signal to the plurality of pixels on a pixel line to pixel line basis to perform an exposure start operation;
   a mechanical focal plane shutter disposed immediately before the image sensor for performing a light path opening operation and a light path closing operation for light led to the image sensor;
   control means for controlling the operations of the image sensor and the mechanical focal plane shutter; and
   exposure control means for determining at least a shutter speed, wherein the control means causes the image sensor to perform the exposure start operation using the electronic focal plane shutter function a predetermined period of time after a curtain group of the mechanical focal plane shutter is open and causes the mechanical focal plane shutter to perform an exposure end operation when the shutter speed is set to low by the exposure control means, and the control means causes the mechanical focal plane shutter to perform the exposure start operation and the exposure end operation when the shutter speed is set to high by the exposure control means.

2. The image pickup apparatus according to claim 1, further comprising:
   vibration detecting means for detecting an amount of vibration applied to the image pickup apparatus, wherein the image pickup apparatus has a vibration correction function for correcting the vibration thereof.

3. The image pickup apparatus according to claim 1, wherein the image sensor is of a MOS type.

4. The image pickup apparatus according to claim 1, wherein the control means causes only the mechanical focal plane shutter to perform the exposure start operation and the exposure end operation when the shutter speed is set to high by the exposure control means.

5. An image pickup apparatus, comprising:
   an image sensor including a plurality of pixels arranged in a matrix, the image sensor having an electronic focal plane shutter function for providing a predetermined reset signal to the pixels on a pixel line to pixel line basis to perform an exposure start operation;
   a mechanical focal plane shutter disposed immediately before the image sensor for performing a light path opening operation and a light path closing operation for light led to the image sensor;

control means for controlling the operations of the image sensor and the mechanical focal plane shutter;

exposure control means for determining at least a shutter speed, the control means causing the image sensor to perform the exposure start operation using the electronic focal plane shutter function and causing the mechanical focal plane shutter to perform an exposure end operation when the shutter speed is set to low by the exposure control means, the control means causing the mechanical focal plane shutter to perform the exposure start operation and the exposure end operation when the shutter speed is set to high by the exposure control means; and a photo-taking lens for forming a subject image on the image sensor, the photo-taking lens having a variable focal length, wherein the control means changes a switching point for determining whether the exposure start operation is performed by the electronic focal plane shutter function or the mechanical focal plane shutter in accordance with the variable focal length.

6. The image pickup apparatus according to claim 5, wherein the control means changes the switching point for determining whether the exposure start operation is performed by the electronic focal plane shutter function or the mechanical focal plane shutter in accordance with information about an aperture value and a position of an exit pupil of the photo-taking lens during a capturing of an image.

7. The image pickup apparatus according to claim 5, wherein, when the exposure start operation is performed through the electronic focal plane shutter function, the control means changes a parameter that controls the exposure start operation through the electronic focal plane shutter function by using at least one of the shutter speed, the variable focal length, an aperture value, and information about a position of an exit pupil.

8. The image pickup apparatus according to claim 6, wherein, when the exposure start operation is performed through the electronic focal plane shutter function, the control means changes a parameter that controls the exposure start operation through the electronic focal plane shutter function by using at least one of the shutter speed, the variable focal length, the aperture value, and information about the position of the exit pupil.

9. An image pickup apparatus, comprising:
an image sensor including a plurality of pixels arranged in a matrix, the image sensor having an electronic focal plane shutter function for providing a predetermined reset signal to the pixels on a pixel line to pixel line basis to perform an exposure start operation;

a mechanical focal plane shutter disposed immediately before the image sensor for performing a light path opening operation and a light path closing operation for light led to the image sensor;

control means for controlling the operations of the image sensor and the mechanical focal plane shutter;

exposure control means for determining at least a shutter speed, the control means causing the image sensor to perform the exposure start operation using the electronic focal plane shutter function and causing the mechanical focal plane shutter to perform an exposure end operation when the shutter speed is set to low by the exposure control means, the control means causing the mechanical focal plane shutter to perform the exposure start operation and the exposure end operation when the shutter speed is set to high by the exposure control means; and an interchangeable photo-taking lens for forming a subject image on the image sensor, wherein the control means changes a switching point for determining whether the exposure start operation is performed by the electronic focal plane shutter function or the mechanical focal plane shutter in accordance with a focal length of a photo-taking lens used.

10. The image pickup apparatus according to claim 9, wherein the control means changes the switching point for determining whether the exposure start operation is performed by the electronic focal plane shutter function or the mechanical focal plane shutter in accordance with information about an aperture value and a position of an exit pupil of the photo-taking lens during a capturing of an image.

11. The image pickup apparatus according to claim 9, wherein, when the exposure start operation is performed through the electronic focal plane shutter function, the control means changes a parameter that controls the exposure start operation through the electronic focal plane shutter function by using at least one of the shutter speed, the focal length, an aperture value, and information about a position of an exit pupil.

12. The image pickup apparatus according to claim 10, wherein, when the exposure start operation is performed through the electronic focal plane shutter function, the control means changes a parameter that controls the exposure start operation through the electronic focal plane shutter function by using at least one of the shutter speed, the focal length, the aperture value, and information about the position of the exit pupil.

13. An image pickup apparatus, comprising:
an image sensor including a plurality of pixels arranged in a matrix, the image sensor having an electronic focal plane shutter function for providing a predetermined reset signal to the pixels on a pixel line to pixel line basis to perform an exposure start operation;

a mechanical focal plane shutter disposed immediately before the image sensor for performing a light path opening operation and a light path closing operation for light led to the image sensor;

control means for controlling the operations of the image sensor and the mechanical focal plane shutter;

exposure control means for determining at least a shutter speed, the control means causing the image sensor to perform the exposure start operation using the electronic focal plane shutter function and causing the mechanical focal plane shutter to perform an exposure end operation when the shutter speed is set to low by the exposure control means, the control means causing the mechanical focal plane shutter to perform the exposure start operation and the exposure end operation when the shutter speed is set to high by the exposure control means;

a photo-taking lens for forming a subject image on the image sensor;

a movable mirror for leading a light ray output from the photo-taking lens to an optical finder and the image sensor; and a release button used for instructing a start of capturing a subject image, wherein, when a light path is made open to the image sensor by the movable mirror in response to an instruction to start capturing the subject image through an operation of the release button, and the exposure start operation is performed by one of focal plane shutters realized by the electronic focal plane shutter function and the mechanical focal plane shutter, the control means causes the one of the focal plane shutters to perform the exposure start operation after a same predetermined period of time has elapsed since an operation of the movable mirror was completed, regardless of whether a low-speed shutter or a high-speed shutter is used.

14. An image pickup apparatus comprising:
an image sensor including a plurality of pixels arranged in a matrix, the image sensor having an electronic focal plane shutter function for providing a predetermined reset signal to the pixels on a pixel line to pixel line basis to perform an exposure start operation;
a mechanical focal plane shutter disposed immediately before the image sensor for performing a light path opening operation and a light path closing operation for light led to the image sensor, wherein the mechanical focal plane shutter comprises a first curtain functioning as a curtain for opening a light path and a second curtain functioning as a curtain for closing the light path;
control means for controlling the operations of the image sensor and the mechanical focal plane shutter, wherein, when the first curtain is in a closed state in which the light path is not open during an image capturing standby time and a low-speed shutter is used, the control means causes the image sensor to perform the exposure start operation using the electronic focal plane shutter function after a predetermined period of time has elapsed since the first curtain was changed from the closed state to an open state; and
exposure control means for determining at least a shutter speed, wherein the control means causes the image sensor to perform the exposure start operation using the electronic focal plane shutter function and causes the mechanical focal plane shutter to perform an exposure end operation when the shutter speed is set to low by the exposure control means, and the control means causes the mechanical focal plane shutter to perform the exposure start operation and the exposure end operation when the shutter speed is set to high by the exposure control means.

15. The image pickup apparatus according to claim 14, wherein the control means controls an opening operation in which the first curtain is changed from the closed state to the open state so that a time when the opening operation is performed is substantially synchronized with a time when a movable mirror operates, and the first curtain moves in a direction opposite to a moving direction of the movable mirror.

16. An image pickup apparatus, comprising:
an image sensor including a plurality of pixels arranged in a matrix, the image sensor having an electronic focal plane shutter function for providing a predetermined reset signal to the pixels on a pixel line to pixel line basis to perform an exposure start operation;
a mechanical focal plane shutter disposed immediately before the image sensor for performing a light path opening operation and a light path closing operation for light led to the image sensor;
control means for controlling the operations of the image sensor and the mechanical focal plane shutter;
exposure control means for determining at least a shutter speed, the control means causing the image sensor to perform the exposure start operation using the electronic focal plane shutter function and causing the mechanical focal plane shutter to perform an exposure end operation when the shutter speed is set to low by the exposure control means, the control means causing the mechanical focal plane shutter to perform the exposure start operation and the exposure end operation when the shutter speed is set to high by the exposure control means;
a photo-taking lens for forming a subject image on the image sensor;
a movable mirror for leading a light ray output from the photo-taking lens to an optical finder and the image sensor; and
a release button used for instructing a start of capturing a subject image, wherein, when a light path is made open to the image sensor by the movable mirror in response to an instruction to start capturing the subject image through an operation of the release button, and the exposure start operation is performed by one of focal plane shutters realized by the electronic focal plane shutter function and the mechanical focal plane shutter, the control means causes the one of the focal plane shutters to perform the exposure start operation after a predetermined period of time has elapsed since an operation of the movable mirror was completed, regardless of whether a low-speed shutter or a high-speed shutter is used,
the mechanical focal plane shutter comprises a first curtain functioning as a curtain for opening the light path and a second curtain functioning as a curtain for closing the light path, and, when the first curtain is in a closed state in which the light path is not open during an image capturing standby time and the low-speed shutter is used, the control means causes the image sensor to perform the exposure start operation using the electronic focal plane shutter function after a predetermined period of time has elapsed since the first curtain was changed from the closed state to an open state.

17. The image pickup apparatus according to claim 16, wherein the control means controls an opening operation in which the first curtain is changed from the closed state to the open state so that a time when the opening operation is performed is substantially synchronized with a time when the movable mirror operates, and the first curtain moves in a direction opposite to a moving direction of the movable mirror.

* * * * *